United States Patent [19]

Uchimura et al.

[11] 4,349,891

[45] Sep. 14, 1982

[54] POSTAL CHARGE PROCESSING SYSTEM WHICH CALCULATES AND DISPLAYS THE DIFFERENCE BETWEEN THE POSTAL CHARGE AND THE STAMP FOR WHEN THE POSTAL CHARGE IS GREATER

[75] Inventors: Mitsuo Uchimura, Numazu; Yoshiharu Nishimura, Mishima, both of Japan

[73] Assignee: Tokyo Electric Co., Ltd., Tokyo, Japan

[21] Appl. No.: 124,602

[22] Filed: Feb. 25, 1980

[30] Foreign Application Priority Data

Apr. 24, 1979 [JP] Japan .................................. 54-50669

[51] Int. Cl.³ .............................................. G06F 15/28

[52] U.S. Cl. .................................... 364/900; 364/466; 364/567; 177/25

[58] Field of Search ... 364/200 MS File, 900 MS File, 364/466, 567; 177/25

[56] References Cited

U.S. PATENT DOCUMENTS 3,978,457 8/1976 Check et al. ........................ 364/200

4,271,470 6/1981 Dlugos et al. .................... 177/25 X

*Primary Examiner*—Raulfe B. Zache

*Attorney, Agent, or Firm*—Frishauf, Holtz, Goodman and Woodward

[57] ABSTRACT

A postal charge processing system includes a data processing unit for calculating the postal charge for a postal parcel based on the weight of the postal parcel and the postal condition including the way of mailing and region of mailing destination, and displaying the calculated postal charge data on a display unit. The postal charge processing system further includes a stamp fee entry key and numeral keys, and the data processing unit compares the calculated postal charge data and stamp fee data generated in accordance with the operation of the stamp fee entry key and numeral keys, calculates the difference between the postal charge data and the stamp fee data and displays the difference on the display unit when the stamp fee data is smaller than the calculated postal charge data.

10 Claims, 29 Drawing Figures

FIG. 9

| Y \ X | 2 | | | |
|---|---|---|---|---|
| | 4 | 3 | 2 | 1 |
| 3 | (AIR) FLAG | (SEA) FLAG | (SD) FLAG | (AOD) FLAG |

FIG. 10

| Y \ X | 3 | | | |
|---|---|---|---|---|
| | 4 | 3 | 2 | 1 |
| 3 | (AC) FLAG | (PI) FLAG | (KEY) FLAG | (SFS) FLAG |

FIG. 11

| Y \ X | 4 | | | |
|---|---|---|---|---|
| | 4 | 3 | 2 | 1 |
| 3 | (AMD) FLAG | (SMD) FLAG | (MSI) FLAG | (SIL) FLAG |

FIG. 12

| Y \ X | 5 | | | |
|---|---|---|---|---|
| | 4 | 3 | 2 | 1 |
| 3 | (SFA) FLAG | (WB1) FLAG | (WB2) FLAG | (ZW) FLAG |

FIG. 13

| Y \ X | 9 | | | |
|---|---|---|---|---|
| | 4 | 3 | 2 | 1 |
| 3 | (NKO) FLAG | (CKL) FLAG | (CD) FLAG | (EG) FLAG |

FIG. 14

| X \ Y | A | | | |
|---|---|---|---|---|
| | 4 | 3 | 2 | 1 |
| 3 | (MD) FLAG | (ED) FLAG | (ACD) FLAG | (AODD) FLAG |

FIG. 15

| X \ Y | B | | | |
|---|---|---|---|---|
| | 4 | 3 | 2 | 1 |
| 3 | (AG) FLAG | (COM) FLAG | (OW) FLAG | (DT) FLAG |

FIG. 16

| X \ Y | E | | | |
|---|---|---|---|---|
| | 4 | 3 | 2 | 1 |
| 3 | (AFSI) FLAG | (AODSI) FLAG | (SDSI) FLAG | (PISI) FLAG |

FIG. 17

| X \ Y | F | | | |
|---|---|---|---|---|
| | 4 | 3 | 2 | 1 |
| 3 | (SDDL) FLAG | (PIDL) FLAG | (PICDL) FLAG | (ADL) FLAG |

FIG. 22
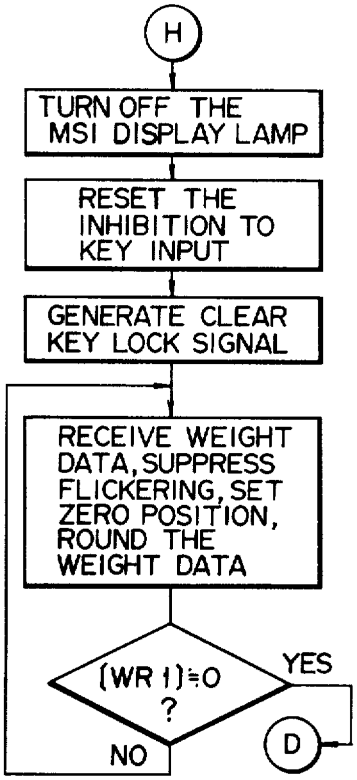
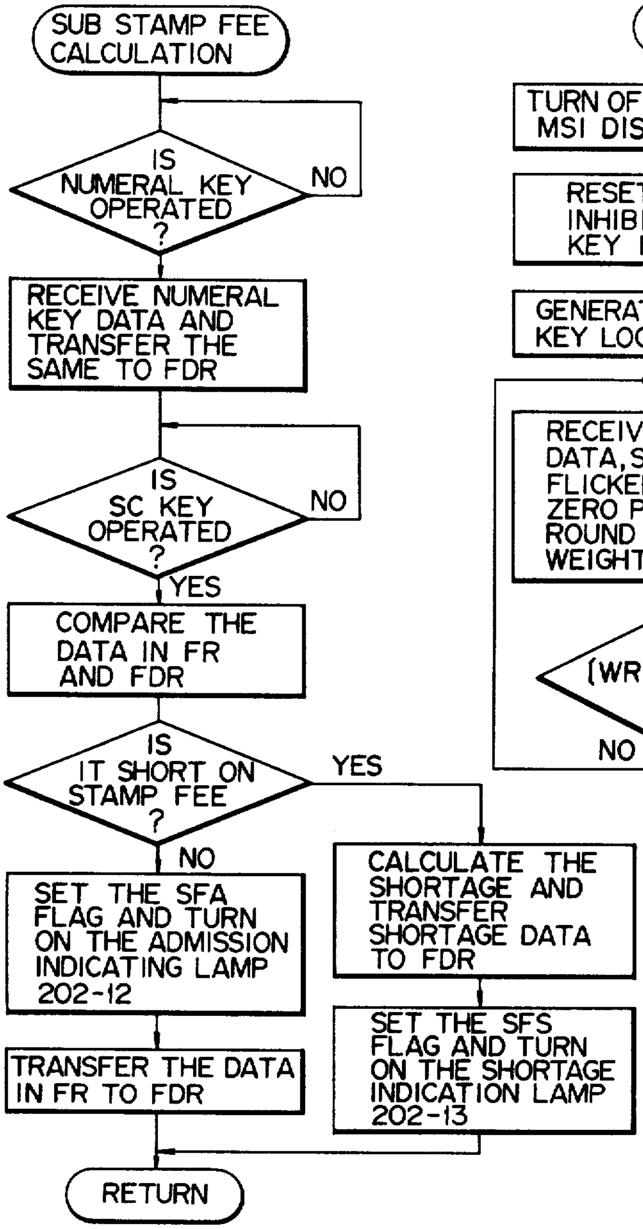
FIG. 29

POSTAL CHARGE PROCESSING SYSTEM WHICH CALCULATES AND DISPLAYS THE DIFFERENCE BETWEEN THE POSTAL CHARGE AND THE STAMP FOR WHEN THE POSTAL CHARGE IS GREATER

BACKGROUND OF THE INVENTION

This invention relates to postal charge processing systems for calculating postal charges for postal articles such as postal parcels.

Hitherto, there has been known a postal charge processing system, in which the postal charge for a postal article such as a postal parcel is calculated in a postal charge calculating section based on weight data produced from a weight measuring section as a result of measuring the weight of the postal article and also data corresponding to selected postal conditions such as the way of mail and region of mailing destination, and the postal charge is displayed.

However, the postal article received from the sender sometimes carries stamps put on it on the basis of an estimated postal charge for it. In this case, it is necessary to check if the affixed stamps correspond to the actual postal charge. Although the prior-art postal charge processing system can calculate the postal charge itself, it can neither calculate nor display a shortage in case, in case when the amount of the stamp fee of the stamps affixed to the postal parcel is short of the calculated postal charge. In such a case, therefore, the operator has to calculate mentally or the like the shortage between the calculated postal charge and the amount of the stamp fee of the stamps affixed to the postal parcel and inform the sender of the shortage calculated in this way. In addition, the operator, having received the insufficient amount, is required to operate keys in accordance with the insufficient amount and issue a meter stamp corresponding to this amount.

SUMMARY OF THE INVENTION

An object of the invention is to provide a postal charge processing system, which can satisfactorily overcome the aforementioned drawbacks.

A postal charge processing system accordin to a preferred mode of the invention comprises weight measuring means for measuring the weight of a postal article and producing weight data corresponding to the measured weight, first switching means for setting various postal conditions including the way of mail and region of mailing destination, first memory means for storing postal condition data produced in accordance with the operation of the first switching means, display means, second switching means operated to produce fee data, second memory means for storing the fee data produced in accordance with the operation of the second switching means, and data processing means for calculating a postal charge based on the weight data from the measuring means and also from the postal condition data stored in the first memory means and supplying the postal charge data thus obtained to the display means for display thereon, the data processing means also functioning in response to the operation of the second switching means to calculate the difference between the calculated postal charge data and the fee data stored in the second memory means when the former data is greater in value than the latter data and supplying the difference data thus obtained to the display means for display thereon.

BRIEF DESCRIPTION OF THE DRAWINGS

FIGS. 9 to 17 show respective memory areas in the random access memory shown in FIG. 8;

FIGS. 18 to 22 show a flow chart of a job program executed by a central processing unit in the postal charge calculating unit shown in FIG. 1;

FIG. 29 is a flow chart for a subroutine for stamp fee data process.

DETAILED DESCRIPTION OF THE PREFERRED EMBODIMENT

Figure 1:
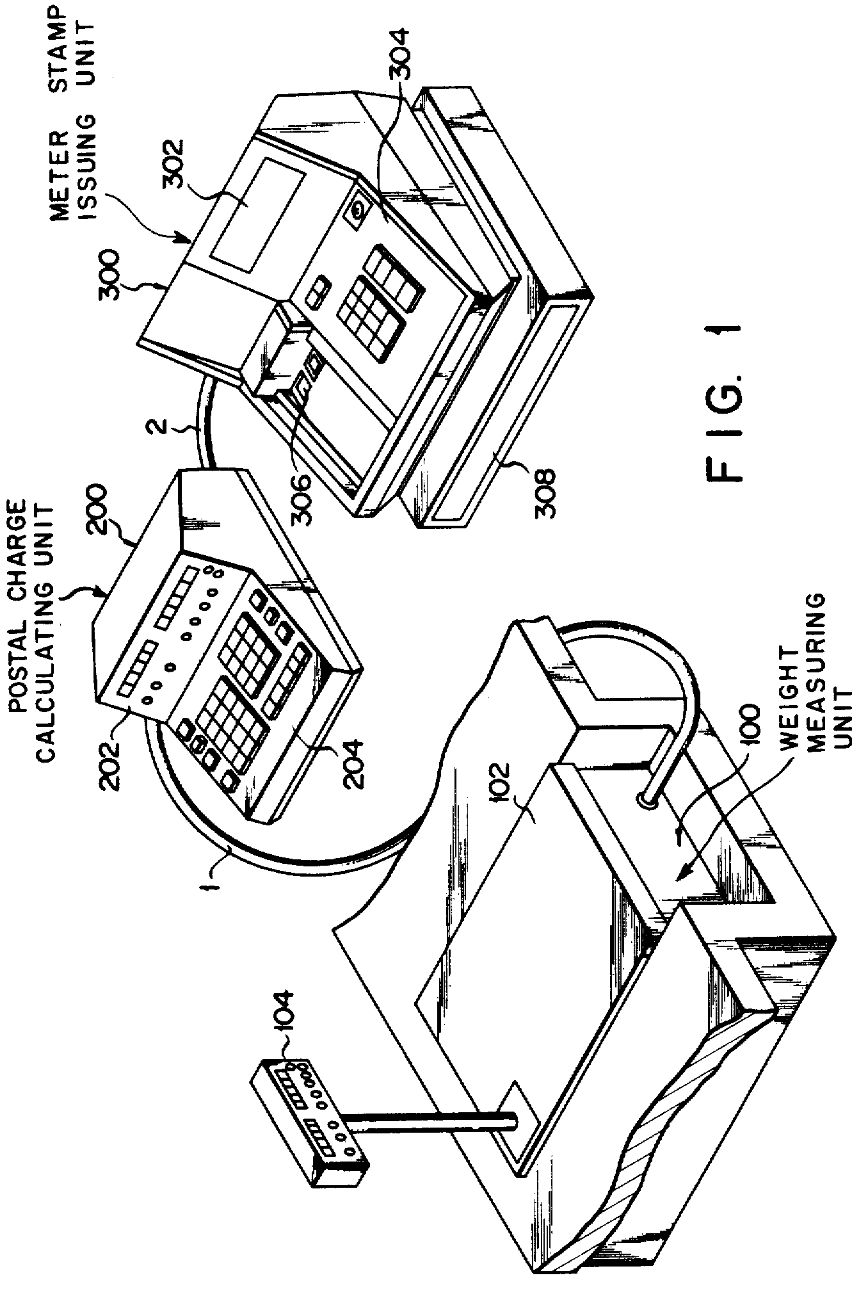
FIG. 1 is a perspective view showing a weight measuring unit, a postal charge calculating unit and a meter stamp issuing unit in one embodiment of the postal charge processing system according to the invention.

FIG. 1 shows a postal charge processing system including a weight measuring unit 100, a postal charge calculating unit 200 electrically coupled to the weight measuring unit 100 via a cable 1 and a meter stamp issuing unit 300 coupled to the potal charge calculating unit 200 via a cable 2. The weight measuring unit 100 includes a measuring base 102 and a display board 104 provided thereon. The postal charge calculating unit 200 includes a display board 202 and a keyboard 204, and the meter stamp issuing unit 300 includes a display board 302, keyboard 304, a meter stamp issuance opening 306 and a drawer 308.

Figure 2:
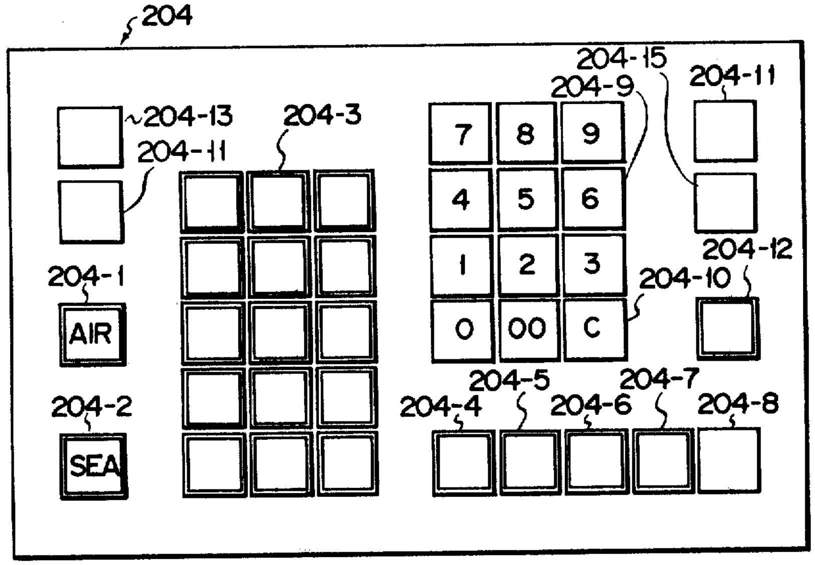
FIGS. 2 and 3 are views respectively showing a keyboard and a display board in the postal charge calculating unit shown in FIG. 1.

FIG. 2 shows the keyboard 204 of the postal charge calculating unit 200. The keyboard 204 has air mail and sea mail keys 204-1 and 204-2 for selecting the way of mail, a plurality of region selection keys 204-3 for selecting the region of destination, an additional charge key 204-4 which is operated when an additional charge is levied on a postal item exceeding a prescribed size, an advice-of-delivery key 204-5 operated when advice of delivery, informing the sender of the fact that the postal item is delivered to the recipient, is requested by the sender, a special delivery key 204-6 operated when special delivery of the postal item is requested, a price indication key 204-7 operated when indication of the compensation price of the content of the postal item is requested and a cancellation key 204-8 for cancelling the postal condition data put in by some of the keys 204-4 to 204-7. The keyboard 204 also has eleven numeral keys 204-9 which represent respective numerals "00", "0" to "9" and are operated to generate data on indicated price of the postal item, a clear key 204-10 operated to clear the price data coupled by the numeral keys 204-9, a zero point adjustment key 204-11 operated to make zero point adjustment of the measuring unit 100 when the zero point is deviated from the initial setting within a range, for instance, from 5 to 300 g, a meter stamp issue key 204-12 operated to transfer the data about the postal charge calculated in the charge calculating unit 200 to the meter stamp issuing unit 300, a repetition key 204-13 operated when calculating the postal charge of a postal item where the postal transfer conditions such as the way of mail, region of destination, advice of delivery and special delivery are the same as those for the previous postal item, a stamp fee entry key 204-14 operated for entering stamp fee data corresponding to the fee of the stamp attached to the postal parcel, and shortage calculation key 204-15 operated after the entry of the stamp fee data to permit calculation for the difference between the calculated postal charge and the fee of the stamp attached to the postal parcel. The keys 204-1 to 204-7 and 204-12 are each formed of a self-illumination type key including a transparent box and a lamp (not shown) which is placed in the box to be turned on when the associated box is depressed.

Figure 3:
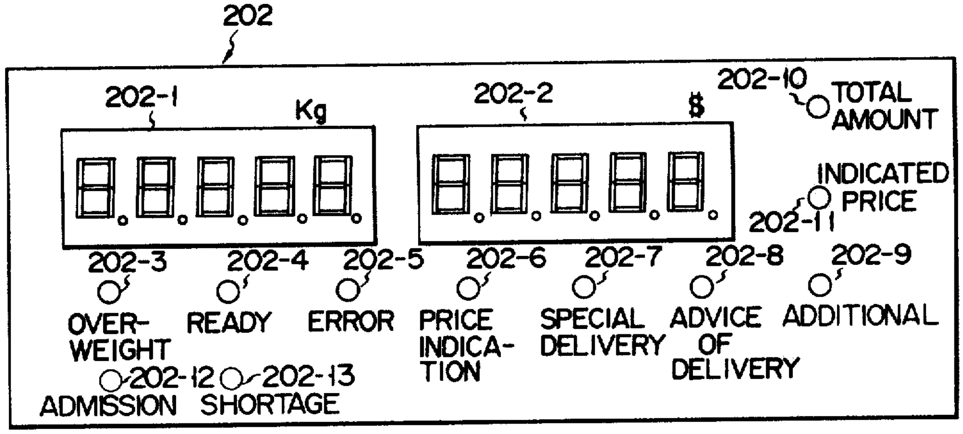

FIG. 3 shows the display board 202 of the charge calculating unit 200. This display board 202 has a five-digit weight display section 202-1 and a five-digit charge display section 202-2. Each digit in these display sections 202-1 and 202-2 is constituted by a total of eight display segments, more particularly seven display elements arranged in the form of a figure eight to display numerical figures and a decimal point display element to display a decimal point. The display board 202 is also provided with an overweight display lamp 202-3, a measurement ready display lamp 202-4, an error display lamp 202-5, a price indication display lamp 202-6, a special delivery display lamp 202-7, an advice-of-delivery display lamp 202-8, a surcharge display lamp 202-9, a total amount display lamp 202-10, an indicated price display lamp 202-11, a stamp fee admission indicating lamp 202-12 and a stamp fee shortage indicating lamp 202-13. The display board 104 of the weight measuring unit 100 has the same construction as the display board 202 of the charge calculating unit 200, so that its description is omitted.

Figure 4:
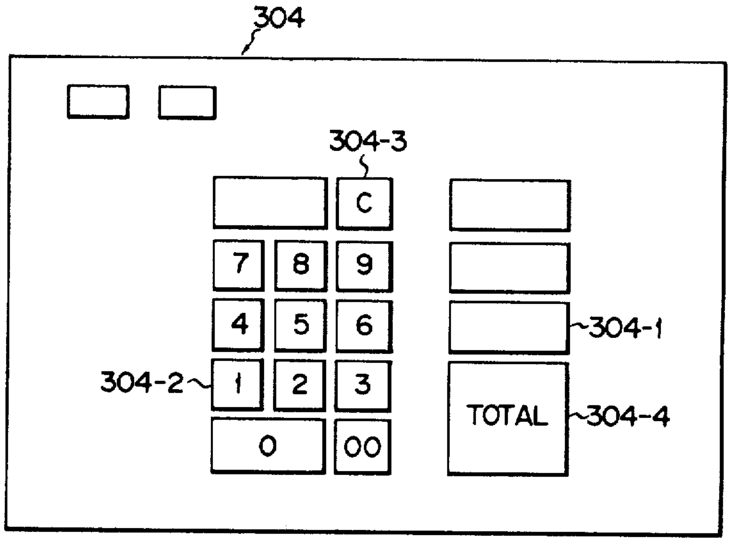
FIGS. 4 and 5 are views showing a keyboard and a display board in the meter stamp issuing unit shown in FIG. 1.

FIG. 4 shows the keyboard 304 of the meter stamp issuing unit 300. This keyboard 304 has a meter stamp issue key 304-1 operated when issuing a meter stamp, eleven numeral keys 304-2 operated to generate data concerning the amount of received money, a clear key 304-3 for clearing the entered money amount data and a total key 304-4 operated when deriving the change from the indicated price on the issued meter stamp and the received amount of money.

Figure 5:
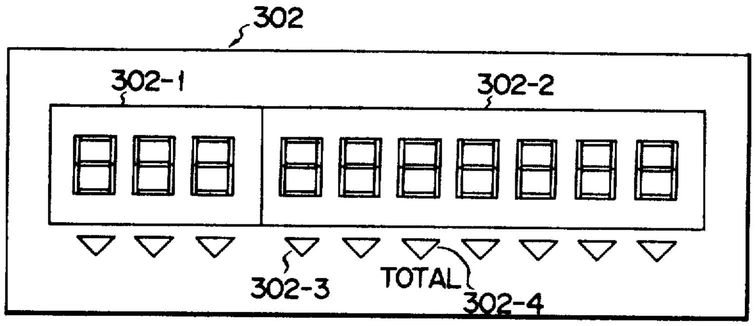

FIG. 5 shows the display board 302 of the meter stamp issuing unit 300. This display board 302 has a three-digit display section 302-1 for displaying the number of copies of the meter stamp to be issued and a seven-digit price display section 302-2 for displaying the price indicated on the meter stamp issued. It is also provided with a meter stamp issuance display lamp 302-3 and a total amount display lamp 302-4 for indicating the operating state of the meter stamp issuing unit 300.

Figure 6:
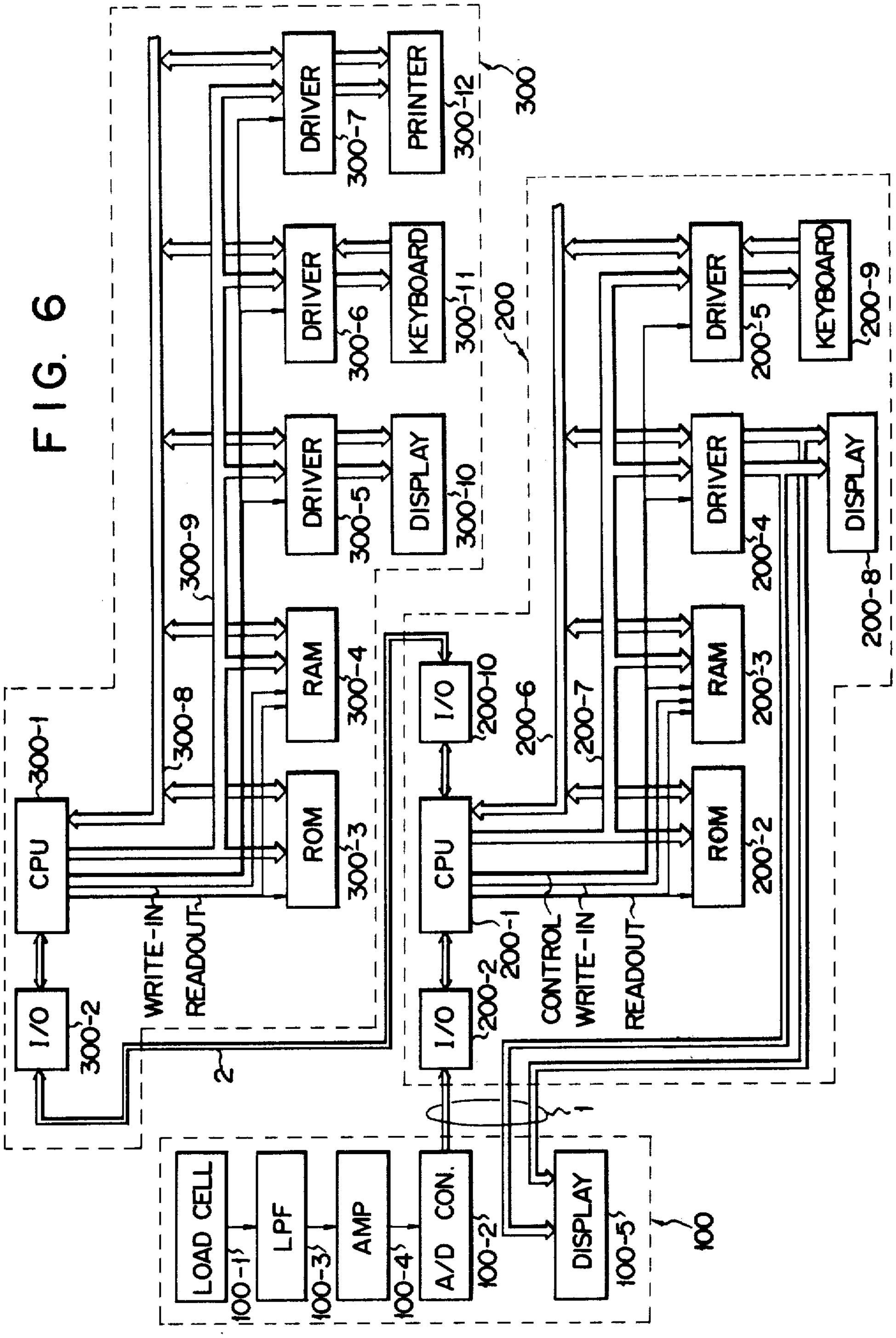
FIG. 6 is a block diagram of the postal charge processing system shown in FIG. 1.

FIG. 6 shows a block diagram representing the circuitry of the weight measuring unit 100, postal charge calculating unit 200 and meter stamp issuing unit 300. The weight measuring unit 100 includes a load cell 100-1 for producing an analog signal corresponding to the weight of a postal parcel put on the measuring base 102 (shown in FIG. 1) and an analog-digital (A/D) converter 100-2 for receiving the analog signal from the load cell 100-1 through a low-pass filter 100-3 and an amplifier 100-4 and converting the input analog signal into a corresponding digital signal. The A/D converter 100-2 supplies a pulse signal at a pulse repetition rate corresponding to the weight of the postal parcel on the measuring base 102 to the postal charge calculating unit 200. The measuring unit 100 further includes a display circuit 100-5 which belongs to the display board 104 shown in FIG. 1.

The postal charge calculating unit 200 includes an input/output (I/O) unit 200-2 and a central processing unit (CPU) 200-1 receiving the pulse signal from the A/D converter 100-2 through the I/O unit 200-2. It also includes a read only memory (ROM) 200-2, a random access memory (RAM) 200-3, a display driver 200-4 and a keyboard driver 200-5, these memories and drivers being coupled to the CPU 200-1 via a data bus 200-6 and an address bus 200-7. If further includes a display circuit 200-8, which belongs to the display board 202 shown in FIG. 3 and is coupled to the display driver 200-4 for the display of data transferred from the CPU 200-1 to the display driver 200-5 via the data bus 200-6. The display circuit 100-5 in the weight measuring unit 100 is also coupled to the display driver 200-4 so that it receives the same data as supplied to the display circuit 200-8. The postal charge calculating unit 200 further includes a keyboard circuit 200-9, which belongs to the keyboard 204 shown in FIG. 2 and is coupled to the keyboard driver 200-5, and key-in data, that is, data generated through keying operation in the keyboard 204 are transferred through the keyboard driver 200-5 to the CPU 200-1. The CPU 200-1 is coupled through another I/O unit 200-10 and the cable 2 to the meter stamp issuing unit 300.

The meter stamp issuing unit 300 includes an I/O unit 300-2 and a CPU 300-1 receiving data from the postal charge calculating unit 200 through the I/O unit 300-2. It also includes a ROM 300-3, a RAM 300-4, a display driver 300-5, a keyboard driver 300-6 and a printer driver 300-7, these memories and drivers being coupled to the CPU 300-1 via a data bus 300-8 and an address bus 300-9. It further includes a display circuit 300-10, which belongs to the display board 302 shown in FIG. 5 and is coupled to the display driver 300-5 for the display of data transferred from the CPU 300-1 to the display driver 300-5 via the data bus 300-8. The meter stamp issuing unit 300 further includes a keyboard circuit 300-11, which belongs to the keyboard 304 shown in FIG. 4 and is coupled to the keyboard driver 300-6, and key-in data generated by key operations in the keyboard 304 are transferred through the keyboard driver 300-6 to the CPU 300-1. The unit 300 further includes a printer circuit 300-12, which is coupled to the printer driver 300-7 for executing printing operation according to data transferred from the CPU 300-1 through the printer driver 300-7.

Figure 7:
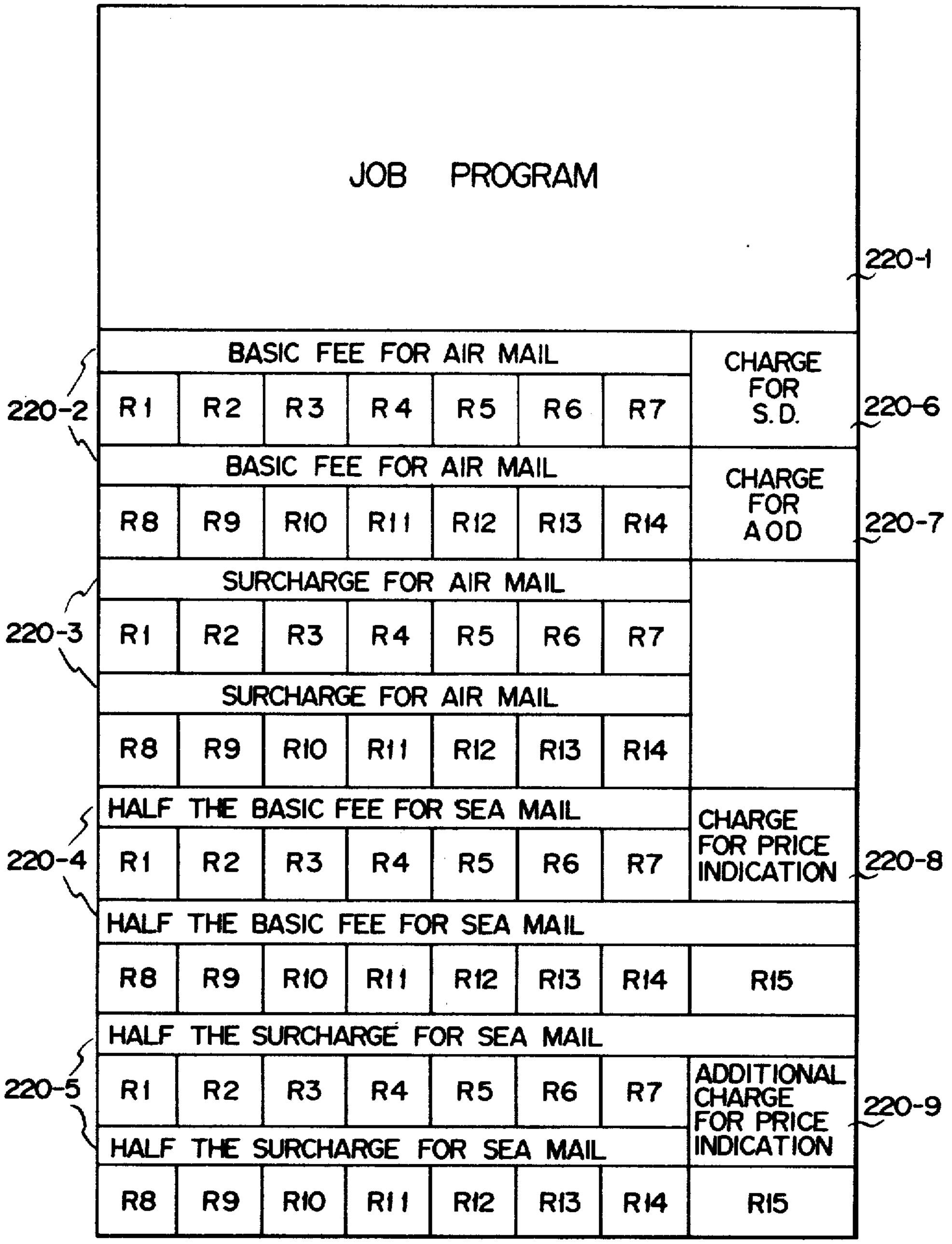
FIG. 7 is a memory map of a read only memory in the postal charge calculating unit shown in FIG. 1.

FIG. 7 shows the memory map of the ROM 200-2 in the postal charge calculating unit 200. As is shown, the ROM 200-2 has a job program memory area 220-1 in which a job program to be executed by the CPU 200-1 in response to the operation of the keyboard 204 and in conformity to the flow charts shown in FIGS. 18 to 28 is stored, a basic fee data memory area 220-2 in which data concerning basic fees for air mail of postal items of weights below a first predetermined weight and destined to first to fourteenth destination regions R1 to R14 are stored, a surcharge data memory area 220-3 in which data concerning surcharges for air mail levied due to overweight on postal item exceeding the first predetermined weight and destined to the first to fourteenth destination regions R1 to R14 are stored, a half the basic fee data memory area 220-4 in which data concerning one half the basic fees for sea mail of postal items of weights below a second predetermined weight and destined to first to fifteenth destination regions R1 to R15 are stored, and a half the surcharge data memory area 220-5 in which data concerning one half the surcharges for sea mail levied due to overweight on postal item exceeding the second predetermined weight and destined to the first to fifteenth destination regions are stored. The ROM 200-2 further includes a special delivery charge data memory area 220-6 in which data concerning special delivery charges for special delivery postal item are stored, an advice-of-delivery charge data memory area 220-7 in which data concerning charges for advice-of-delivery are stored, a price indication charge data memory area 220-8 in which data concerning charges for indication of compensation price of the content of postal item are stored, and an additional charge data memory area 220-9 in which data concerning additional charges levied when indication of price higher than a predetermined compensation price is requested are stored.

Figure 8:
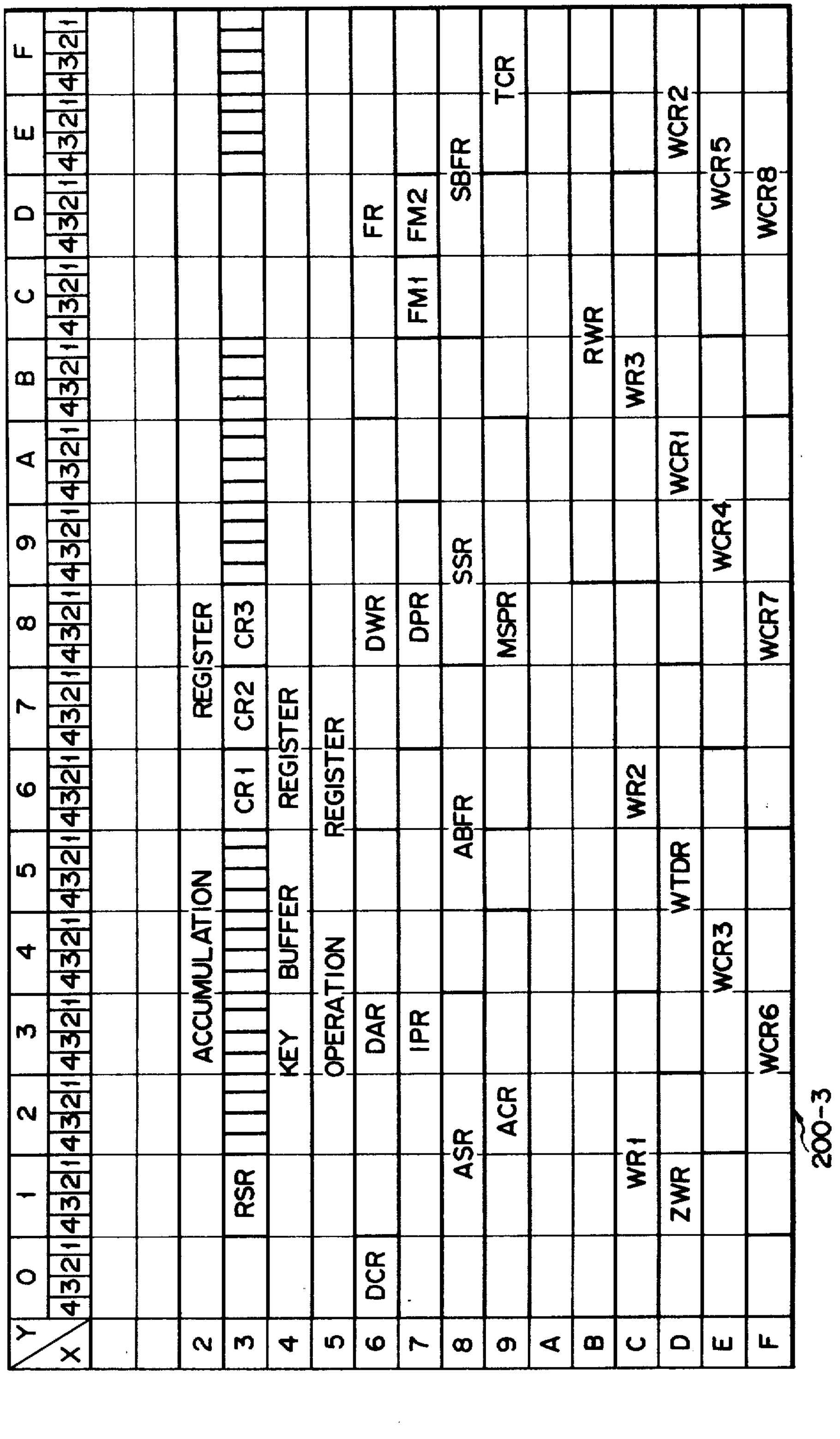
FIG. 8 is a memory map of a random access memory in the postal charge calculating unit shown in FIG. 1.

FIG. 8 shows the memory map of the RAM 200-3 in the postal charge calculating unit 200. As is shown, the RAM 200-3 has 256 word memory areas individually having four bit positions and specified by combinations of 14-bit X-direction address data and 14-bit Y-direction address data transferred from the CPU 200-1. The memory areas of addresses [2, 0] to [2, F], that is, with X-address of [2] and Y-addresses of [0] to [F], constitute an ACCUMULATION register for storing addition results of the basic postal fee and the special charge, the memory area of address [3, 1] constitutes a region selection register (RSR) for storing the selected destination region data, the memory areas of addresses [3,6], [3,7] and [3, 8] constitute respective first to third count registers CR1 to CR3 for storing the number of measured weight data of the same value, the memory areas of addresses [4, 0] to [4, F] constitute a KEY BUFFER register for temporarily storing key-in data, the memory areas of addresses [5, 0] to [5, F] constitute an OPERATION register for storing intermediate results of operation at the time of data processing, the memory area of address [6, 0] constitutes a digit count register (DCR), the memory areas of addresses [6, 1] to [6, 5] constitute a display amount register (DAR), the memory areas of addresses [6, 6] to [6, A] constitute a display weight register (DWR), and the memory areas of addresses [6, B] to [6, F] constitute a fee register (FR). The memory areas of addresses [7, 0] to [7, 6] constitute an indicated price register (IPR), the memory areas of addresses [7, 7] to [7, 9] constitute a decimal point register (DPR), the memory areas of addresses [7, C] and [7, D] constitute respectively first and second function memories (FM1 and FM2), the memory areas of addresses [8, 0] to [8, 3] constitute a surcharge register (ASR) for storing data concerning surcharge levied for air mail, due to overweight, the memory areas of addresses [8, 4] to [8, 7] constitute a basic fee register (ABFR) for storing basic fee data for air mail, the memory areas of addresses [8, 8] to [8, B] constitute a surcharge register (SSR) for storing data of half the surcharge levied for sea mail due to overweight, the memory areas of addresses [8, C] to [8, F] constitute a basic fee register (SBFR) for storing data of half the basic fee for sea mail, the memory areas of addresses [9, 0] to [9, 4] constitute an additional charge register (ACR), the memory areas of addresses [9, 6] to [9, A] constitute a meter stamp price register (MSPR), the memory areas of addresses [9, E] and [9, F] constitute a time counting register (TCR), the memory areas of addresses [B, 9] to [B, E] constitute a rounded weight register (RWR), the memory areas of addresses [B, F] to [C, 0] constitute a first weight register (WR1), the memory areas of addresses [C, 4] to [C, 8] and those of addresses [C, 9] to [C, D] respectively constitute second and third weigh registers (WR2 and WR3), the memory areas of addresses [C, E], [C, F] and [D, 0] to [0, 2] constitute a zero weight register (ZWR), the memory areas of addresses [D, 3] to [D, 7] constitute a weight truth data register (WTDR), the memory areas of addresses [D, 8] to [D, C], [E, 2] to [E, 6], [E, 7] to [E, B], [F, 1] to [F, 5], [F, 6] to [F, A] and [F, B] to [F, F] respectively constitute first, third, fourth, sixth, seventh and eighth weight count registers (WCR1, WCR3, WCR4, WCR7 and WCR8), the memory areas of addresses [D, D], [D, F], [E, O] and [E, 1] constitute a second weight count register (WCR2), and the memory areas of addresses [E, C] to [E, F] and [F, 0] constitute a fifth weight count register (WCR5). The memory area of address [3, 2] stores flag data about advice of delivery (AOD), special delivery (SD), sea mail (SEA) and air mail (AIR) in the first to fourth bit positions as shown in FIG. 9. The memory area of address [3, 3] stores flag data about stamp fee shortage (SFS), key operation (KEY), price indication (PI) and surcharge (AC) in the first to fourth bit positions as shown in FIG. 10. The memory area of address [3, 4] stores flag data about the on-off state of all self-illumination type lamps (SIL), that of the self-illumination type lamp for meter stamp issuance display (MSI), that of the self-illumination type lamp for sea mail display (SMD) and that of the self-illumination type lamp for air mail display (AMD) in the respective first to fourth bit positions as shown in FIG. 11. The memory area of address [3, 5] stores flag data about zero weight (ZW), second weight balance (WB2) and first weight balance (WB1) and stamp fee admission (SFA) in the respective first to fourth bit positions as shown in FIG. 12. The memory area of address [3, 9] stores flag data about error generation (EG), count display state (CD), clear key lock state (CKL) and numeral key operation (NKO) in the first to fourth bit positions as shown in FIG. 13. The memory area of address [3, A] stores flag data about the on-off state of the advice-of-delivery display lamp, (AODD), that of the surcharge display lamp (ACD), that of the error display lamp (ED) and that of the measurement ready display lamp (MD) in the first to fourth bit positions as shown in FIG. 14. The memory area of address [3, B] stores flag data about data transmission (DT), overweight (OW), operation of counting the number of measurements (COM) and alarm generation (AG) in the first to fourth bit positions as shown in FIG. 15. The memory area of address [3, E] stores flag data about the on-off state of the price indication display self-illumination type lamp (PISI), that of the special delivery display self-illumination type lamp (SDSI), that of the advice-of-delivery display self-illumination type lamp (AODSI) and that of the additional fee display self-illumination type lamp (AFSI) in the respective first to fourth bit position as shown in FIG. 16. The memory area of address [3, F] stores flag data about the display state of the amount display lamp (ADL), that of the price indication charge display lamp (PICDL), that of the price indication display lamp (PIDL) and that of the special delivery display lamp in the respective first to fourth bit positions as shown in FIG. 17.

In the postal charge calculating unit 200, the ROM 200-2, RAM 200-3, display driver 200-4 and keyboard driver 200-5 are controlled according to the keying operation in the keyboard 204 on the basis of the job program stored in the ROM 200-2 as shown by the flow chart in FIGS. 18 to 23.

Figure 18:
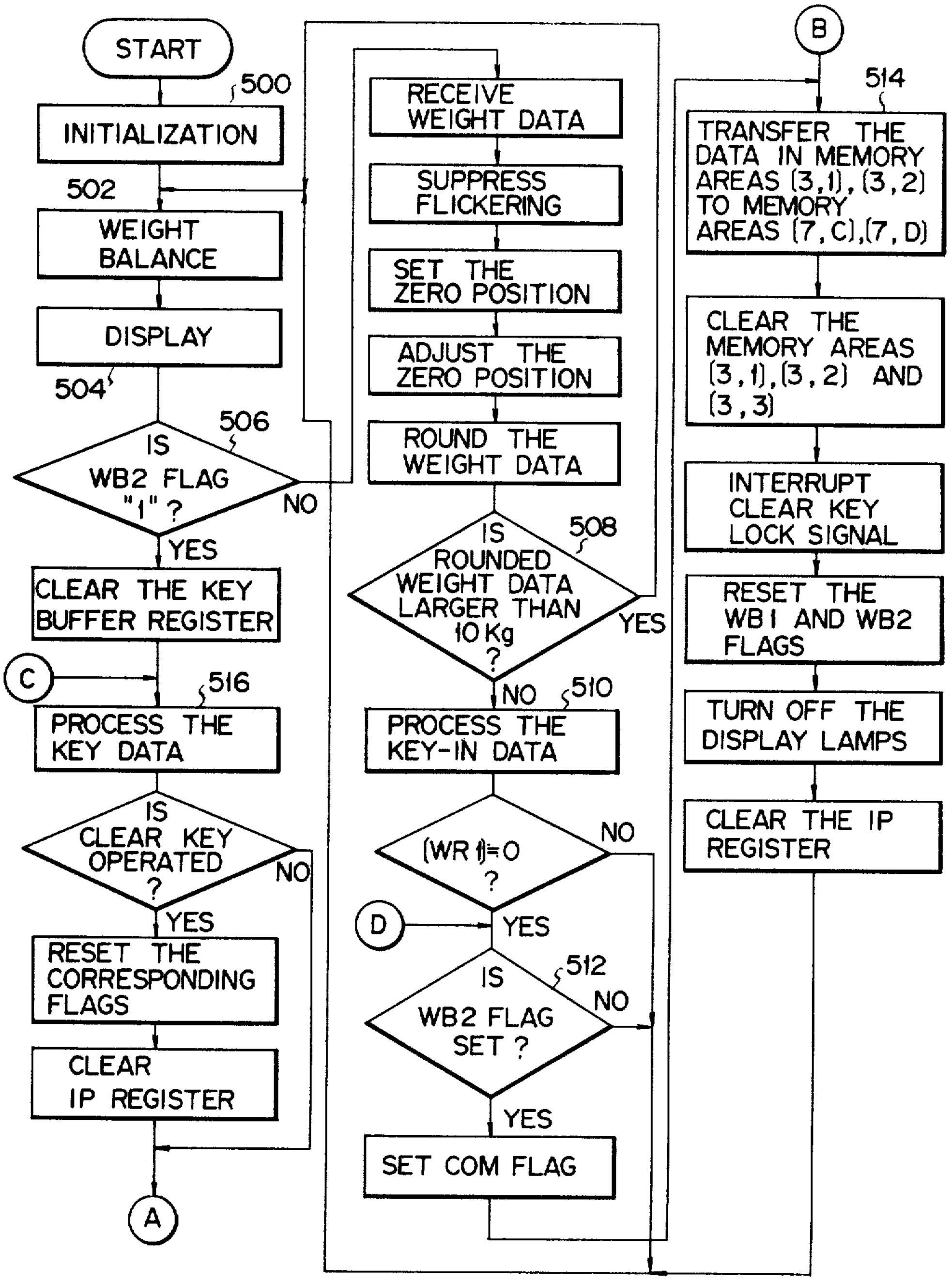
Figure 23:
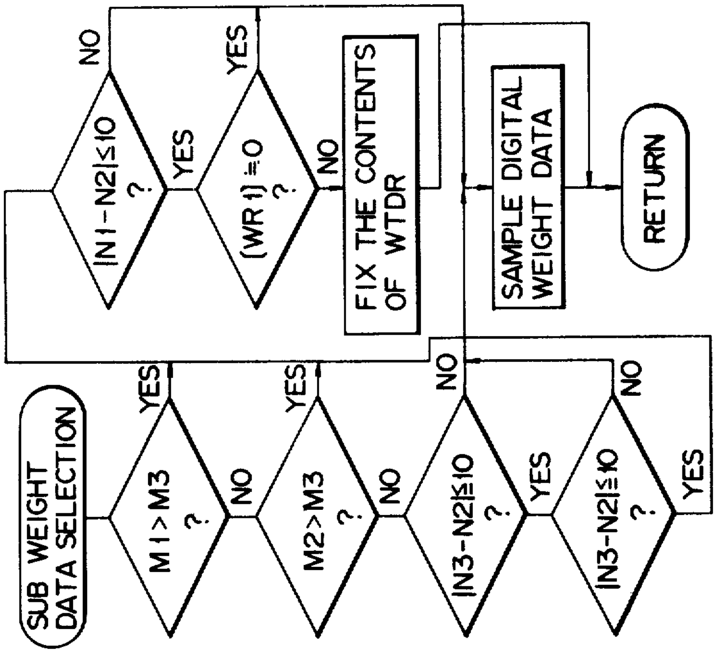
FIG. 23 shows a flow chart for a subroutine for weight data selection.

When the postal charge processing system shown in FIG. 1 is coupled to a power source (not shown), a state ready for the post charge processing is established in an initialization step 500 shown in FIG. 18. In this initialization step 500, selection of weight data, suppression of flickering, automatic zero adjustment, zero setting, rounding of the weight data and extinguishing of display lamps are executed like the prior-art postal charge processing system of this sort. In the execution of the weight data selection, digital weight data representing the number of pulses corresponding to the weight of the load and generated from the weight measuring unit 100, is written into the first weight data register WR1 at a predetermined sampling rate, and the contents of the register WR1 are progressively shifted from the first to the eighth weight count registers WCR1 to WCR8 and written therein. The, the number of those data among the digital data stored in the second to eighth weight count registers WCR2 to WCR8 which have the same value as that stored in the first weight count register WCR1 is counted, and the count data M1 indicating the number of digital data of the same value is written in the first count register CR1. Similarly, the number of those data among the digital data stored in the third to eighth weight count registers WCR3 to WCR8 which have the same value as that stored in the second weight count register WCR2 is detected, and the count data M2 indicating the number of the digital data having the same value is written in the second count register CR2. Also, the number of those data among the digital data stored in the fourth to eighth weight count registers WCR4 to WCR8 which have the same value as that stored in the third weight count register WCR3 is detected, and the count data M3 indicating the number of the digital data having the same value is written in the third count register CR2. It is assumed that the digital weight data stored in the first to third weight count registers WCR1 to WCR3 are respectively represented by N1, N2 and N3 pulses. In this case, if $M1>M3$ and $|N1-N2|\leqq 10$ or $M1\leqq M3<M2$ and $|N1-N2|\leqq 10$ or $M1, M2\leqq M3$ and $|W1-N3|\leqq 10$, as shown in FIG. 23, and the content [WR1] of the first weight data register WR1 does not represent 0g, the count data of the greatest value among the count data M1, M2 and M3 is stored in the third weight data register WR3 and weight truth data register WTDR, and also the first weight balance (WB1) flag is set. Also, if five or more weight data of the same value other than a value representing 0g are detected, the corresponding count data is stored not in the third weight data register WR3 but in the second weight data register WR2, while the WB1 flag is set. When the WB1 flag is set in this way, the data shift operation with respect to the first to eighth weight count registers WCR1 to WCR8 is stopped. Further, if the aforementioned condition regarding the weight data is not satisfied, the weight data from the measuring unit 100 is repeatedly and progressively stored in the first to eighth weight count registers WCR1 to WCR8.

The weight data that is stored in the weight truth data register WTDR in the above way is one which represents the number of pulses. This weight data is rounded or converted into one directly corresponding to the weight such that, for instance, 10 pulses represent 5 grams. The rounded weight data thus obtained is stored in the rounded weight register RWR.

The suppression of flickering is executed in such a manner that the data in the weight truth data register WTDR is kept unchanged irrespective of a change of the data in the third weight data register WR3 within a predetermined range before the weight data is fixed in the weight truth data register WTDR.

The automatic setting of zero position is executed when the prevailing indication substantially corresponding to 0g is deviated from the intially set zero position within a range of, for instance, ±8 pulses in the case where 5 grams is represented by 10 pulses; at this time the prevailing indication substantially corresponding to 0g indication is automatically adjusted to the initially set zero position. In order to initially set such zero position, the CPU 200-1 reads out zero position digital data representing, for example, 2200 count pulses and writes the same into the zero weight register ZWR in the initialization step 500.

The extinguishing of display lamps is executed by storing a display invalid data or "F" data in each memory area in the display amount register DAR and display weight register DWR. As a result, the individual digit display lamps in the weight display section 202-1 and charge display section 202-2 are turned off.

Further in the initialization step 500 all the display lamps are extinguished and checked if they can operate properly, and also the individual data display sections are checked by supplying signals representing numbers "0" to "9" to all the digits of the data display sections. Further, the content of the KEY BUFFER register is cleared to bring an end to the initialization step 500, so that the system is now ready for the postal charge processing operation.

When the ready state is thus established, whether or not to receive key-in data produced by keying operation in the keyboard 204 is determined in accordance with the weight of the postal item placed on the measuring base 102 at this moment. More particularly, in the weight balance step 502 whether or not the second weight balance (WB2) flag is set in the second bit position of the memory area of address [3, 5] is checked and, if it is not set, the weight display section 202-1 (FIG. 3) is turned off, as shown in detail in FIG. 24. Next, whether or not the first weight balance (WB1) flag is set in the third bit position in the memory area [3, 5] is checked and, if it is set, it is checked to see if the content of the rounded weight register RWR has a value greater than a predetermined weight value, for instance 15 kg. If the content of the register RWR has a value greater than 15 kg, the alarm generation (AG) flag is set in the fourth bit position in the memory area of address [3, C] the overweight display (0W) flag is set in the second bit position of this memory area, the overweight display lamp 202-3 is turned on, and reception of key-in data provided by keying operation in the keyboard 204 is inhibited.

If the data in the register RWR has a value less than 15 kg. the data in the rounded weight register RWR is transferred to the display weight register DWR. Next, if the data in the register RWR has a value greater than a predetermined weight value, for instance 10 kg, the same process as in the case of a value greater than 15 kg as mentioned above is executed. If the data in the register RWR has a value less than 10 kg, the overweight display lamp 202-3 is turned off, and then it is checked if the zero weight (ZW) flag is set in the first bit position of the memory area of address [3, 5]. If the ZW flag is set, that is, it is detected that no load is placed on the measuring base 102 the measurement ready display lamp 202 ∝ is turned on, and the reception of key-in data is permitted. If the ZW flag is not set, the measurement ready display lamp 202-4 is turned off, and then whether or not the data of the register RWR has a value less than 30 g is checked. If the weight data has a value less than 30 g, the reception of key-in data is permitted. If the weight data has a value greater than 30 g, the WB2 flat is set, and then the reception of key-in data is permitted. The WB2 flag is set when the weight data has a value between 30 g and 10 kg. Also even in case if neither of the WB1 and WB2 flags is set or if the WB2 flag is set, the reception of key-in data is permitted.

It is to be understood that in the weight balance step, if the weight data in the register RWR has a value between 30 g and 10 kg, the WB2 flag is set and the reception of the key-in data is permitted. In a case where the weight data has a value representing a weight less than 30 g, the reception of key-in data is permitted only when the ZW flag is set. Further, if the weight data has a value greater than 10 kg, the overweight display lamp 202-3 is turned on, the reception of key-in data is inhibited. The WB1 flag is set when the weight data in the weight truth data register WTDR is fixed after the weight measurement is started as mentioned earlier.

Figure 25:
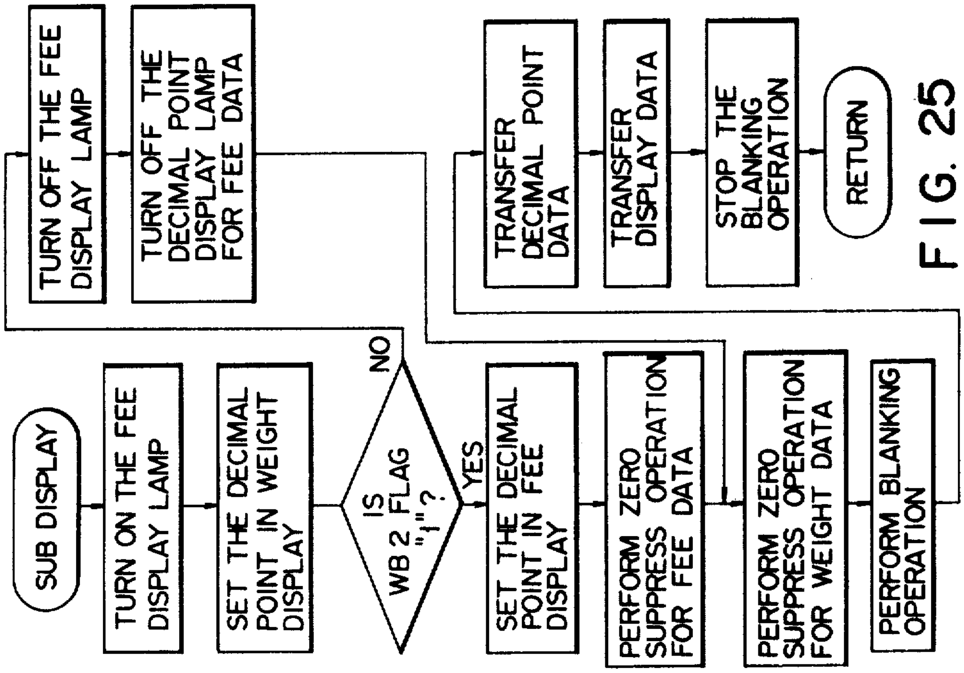
FIG. 25 shows a flow chart for a subroutine for display.
Figure 24:
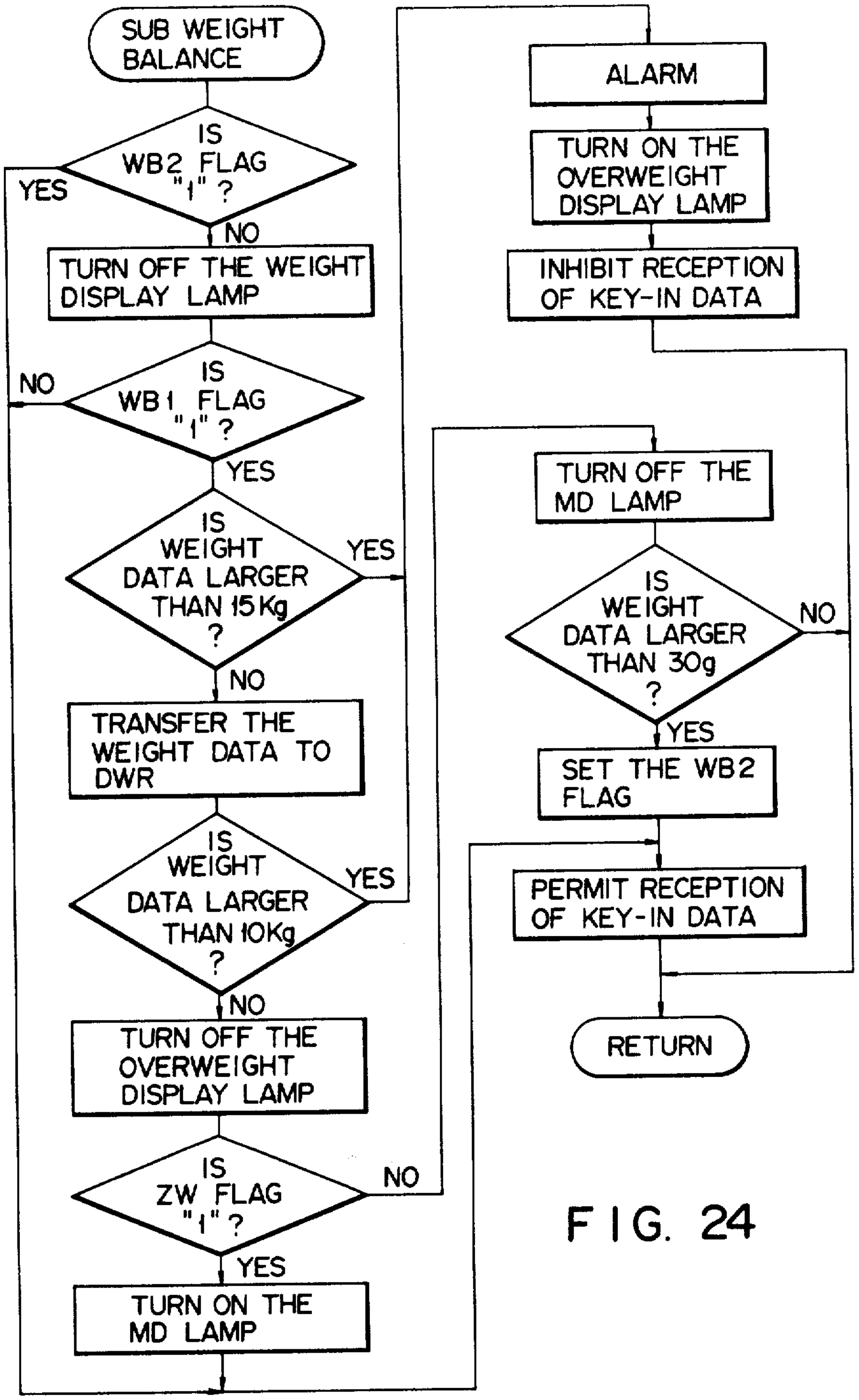
FIG. 24 shows a flow chart for a subroutine for weight balance.
Figure 26:
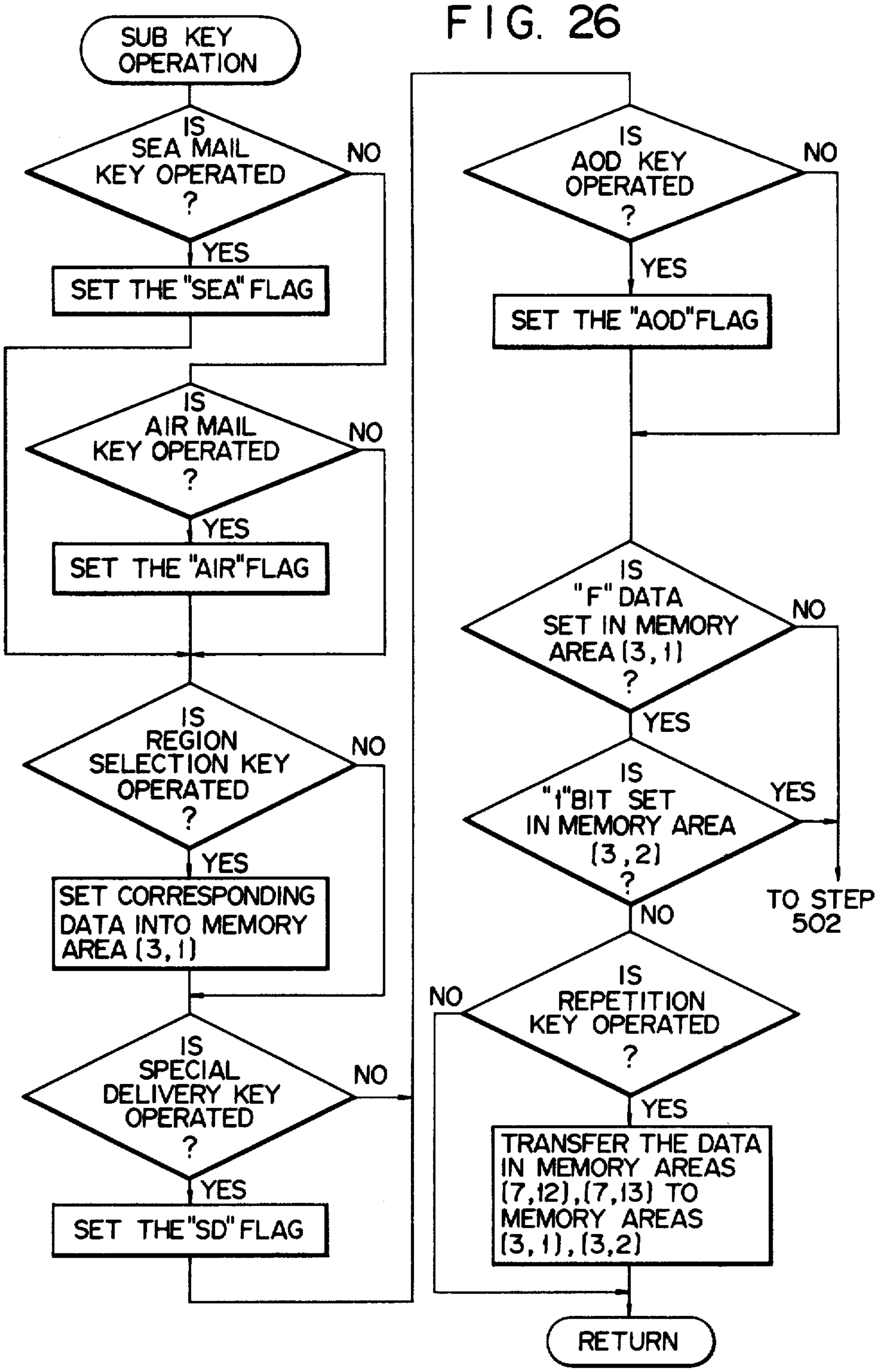
FIG. 26 shows a flow chart for a subroutine for key operation.

When the weight balance step 502 is ended, a display step 504 is executed. As shown in FIG. 25, in the display step 504 the free lamp 202-10 is first turned on, and then the decimal point position in the weight display section 202-1 is set. Next, it is checked if the second weight balance (WB2) flag is set. If the WB2 flag is set, that is, if the weight of the postal parcel is detected to be within a range between30 g and 10 kg, the decimal point position in the fee display section 202-2 is set, and at the same time zero suppression with respect to the fee data is executed. If the WB2 flag is not set, the fee display section 202-2 is deenergized, and also the decimal point display lamp in the fee display section 202-2 is also turned off. Subsequently, zero suppression with respect to the weight data, blanking, transfer of the decimal point data and fee display data to the display section 202 and releasing of blanking are executed in the mentioned order. This means that in the display data processing step 504 the weight data is transferred from the rounded weight register RWR to the display section 202, and if the WB2 flag is set the fee data is also transferred from the fee register FR to the display section 202.

In the next step 506, whether or not the WB2 flag is set is checked. If the WB2 flag is not "1", that is, if the weight of the postal parcel is detected to be out of a range, for instance, between30 g and 10 kg, selection of true weight data, suppression of flickering, automatic adjustment of zero position and key-setting of zero position are executed, and the received weight data is rounded in the manner as described before. The keysetting of the zero position is executed by operating the zero adjustment key 204-11 when the zero position is deviated beyond a range capable of automatic zero position adjustment and in a range between, for example, 5 and 300 g. In a step 508, whether or not the rounded weight data has a value greater than 10 kg is checked. If the rounded weight data represents a weight greater than 10 kg, the weight balance step 502 is executed again. If the rounded weight data represents a value less than 10 kg, the key-in data is processed in a step 510, as shown in detail in FIG. 26. In this step 510, whether or not the sea mail key 204-2 is operated is checked first. If the operation of the sea mail key 204-2 is detected, data "1" and "0" are respectively written in the third and fourth bit positions in each of the memory areas of addresses [3, 2] and [3, 4]. As a result, the self-illumination type lamp (not shown) for the key 204-2 is turned on. If the key 204-2 is not operated, whether or not the air mail key 204-1 is operated is checked. If the operation of the key 204-1 is detected, data "0" and "1" are respectively written in the third and fourth bit positions in each of the memory areas of addresses [3, 2] and [3, 4]. As a result, a self-illumination type lamp (not shown) for the key 204-1 is turned on. In a case where data "1" is written in the third or fourth bit position in the memory area of address [3, 2] or if neither the air mail key 204-1 nor the sea mail key 204-2 is operated it is checked if any region selection key 204-3 is operated. If one of the region selection keys 204-3 is operated, data corresponding to the operated region selection key is written in the region selection register RSR of address [3, 1], and the corresponding self-illumination type lamp is turned on. Next, whether or not the special delivery key 204-1 is operated is checked. If it is operated, data "1" is written in the second bit position in the memory areas of addresses [3, 2] and 8 3, E] and in the fourth bit position in the memory area of address [3, F]. As a result, the self-illumination type lamp for the key 204-6 and the special delivery display lamp 202-7 are turned on. Then, it is checked if the advice-of-delivery key 204-5 is operated. If the operation of the key 204-5 is detected, data "1" is written in the first bit position in the memory areas of addresses [3, 2] and [3, A] and the third bit position in the memory area of address [3, E], and the self-illumination type lamp for the key 204-5 and advice-of-delivery display lamp 202-8 are turned on.

If none of the region selection keys 204-3 is operated, "F" data, that is, data [1, 1, 1, 1], is written in the region selection register RSR. If "F" data stored in the region selection register RSR or data "1" is written in any bit position in the memory area of address [3, 2], the weight balance step 502 is executed again. If "F" data is stored in the region selection register RSR and data "0" is stored in each bit position in the memory area of address [3, 2], the reception of the key-in data of the repetition key 204-13 is permitted. When the repetition key 204-13 is operated under the above condition, the data stored in the first and second function memory areas FM1 and FM2 are transferred to the respective memory areas of addresses [3, 1] and [3, 2].

When the step 510 is ended in this way, it is checked if the content [WR1] of the weight register WR1 has a value corresponding to 0g of representing count pulses of 2200±559. If it is detected that the content of the weight data register WR1 corresponds to 0g, whether or not the WB2 flag is set is checked in a step 512. If it is not detected that the content of the register WR1 corresponds to 0g or if the WB2 flag is not set, the weight balance step 502 is executed again. If the setting of the WB2 is not detected in the step 512, the COM flag which represents completion of measurement is set in the third bit position in the memory area of address [3, B]. Subsequently, in a step 514 the data in the memory areas of addresses [3, 1] and [3, 2] are transferred to the first and second function memory areas FM1 and FM2, and then the memory areas 8 3, 1], [3, 2] and [3, 3] are cleared. Further, the clear key lock signal is interrupted, the WB1 and WB2 flags are reset, the display lamps associated with the memory areas [3, 1], [3, 2] and [3, 3] are turned off, and the indicated price register IPR is cleared. Thereafter, the weight balance step 502 is executed again.

Figure 19:
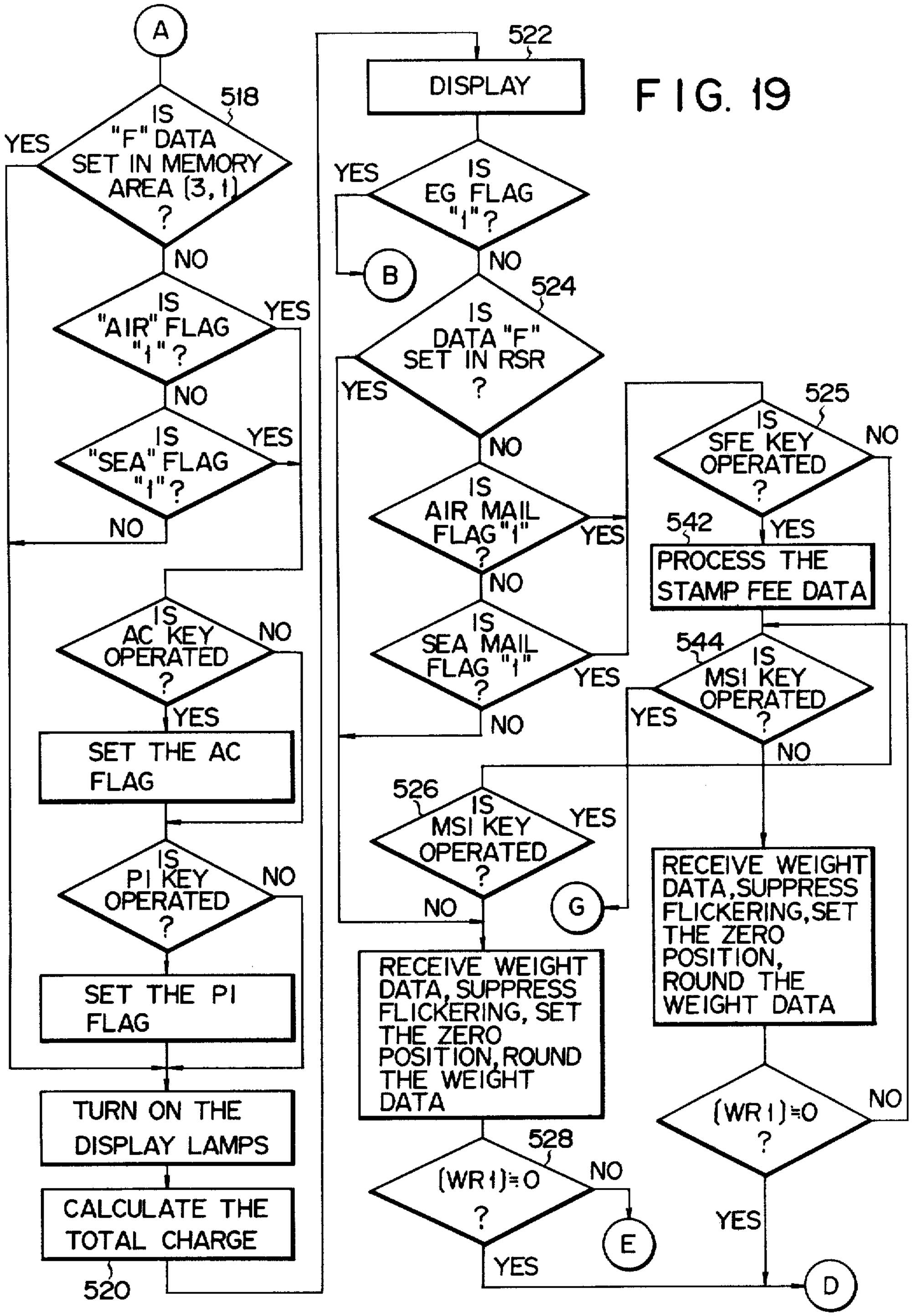

In the meantime, if it is detected in the step 510 that the WB2 flag is set, key-in data processing similar to that in the step 510 as shown in FIG. 19 is executed in a step 516 after the KEY BUFFER register has been cleared. Subsequently, whether or not the clear key 204-8 is operated is checked. If it is detected that the clear key 204-8 is operated, data "0" is written in the third and second bit positions in the memory area [3, 2] and the third and fourth bit positions in the memory area [3, 3], and the indicated price register IPR is cleared.

Figure 20:
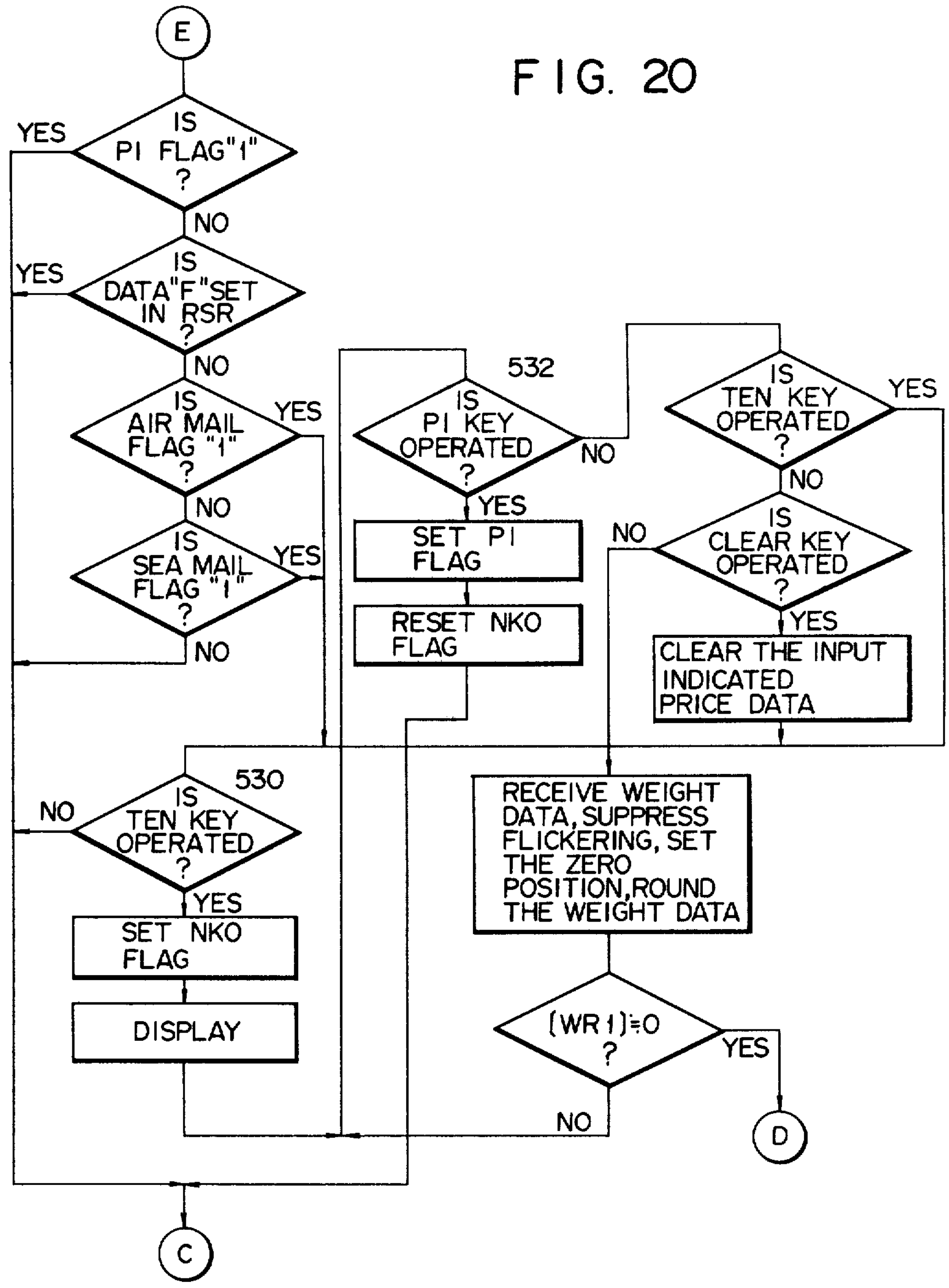

Thereafter, in a step 518 shown in FIG. 19, whether or not "F" data is written in the memory area [3, 1] is checked. If the "F" data is not detected, whether or not data "1" is written in the fourth and third bit positions in the memory area [3, 2], that is, whether or not the AIR and SEA flags are set, is checked. If the AIR or SEA flag is detected to be set, whether or not the additional charge key 204-4 is operated is then checked. If the key 204-4 is operated, data "1" is written in the fourth bit position in the memory area [3, 3], and then whether or not the price indication key 204-7 is operated is checked. If it is detected that the price indication key 204-7 is operated, data "1" is written in the third bit position in the memory area [3, 3], and then various lamps are turned on according to the data stored in the memory areas [3, 1], [3, 2] and [3, 3]. The turn-on operation of these various lamps is also executed when it is detected in the step 518 that "F" data is set in the memory area [3, 1] or when it is detected after the step 518 that the AIR or SEA flag is set. Subsequently, the total postal charge is calculated in a step 520. As shown in detail in FIG. 27, in the total postal charge calculation step 520, whether or not "F" data is written in the memory area [3, 1] is first checked. If it is detected that "F" data is written in the memory area [3, 1], a display step 522 similar to the display step 504 is executed. If it is detected that no "F" data is written in the memory area [3, 1], data representing one half the basic sea mail fee and one half the sea mail surcharge for the specified destination region are read out from the ROM 200-2 in accordance with the data stored in the memory area [3, 1], that is, the region selection register RSR and respectively written in the basic fee register SBFR and surcharge register SSR. At this time, fee data corresponding to half the basic sea mail fee is also written into the fee register ACR. If the weight data in the rounded weight register RWR representing the weight of the postal parcel has a value greater than a predetermined weight value W1, one half the surcharge for sea mail is added to the fee data in the additional charge register ACR a number of times corresponding to the overweight. In other words, if the afore-mentioned weight data has a value greater than the predetermined weight value W1, data corresponding to one half the sea mail surcharge due to overweight is added to the fee data in the addition charge register ACR, and the result is written in the addition charge register ACR while at the same time subtracting weight data corresponding to a predetermined unit weight, for instance 1 kg, from the afore-mentioned rounded weight data. If the result of subtraction of 1 kg, is still greater than the predetermined weight value W1, the data corresponding to one half the sea mail surcharge due to overweight is again added to the fee data in the additional charge register ACR, and the sum of the fee data written in the additional charge register ACR while subtracting data corresponding to 1 kg from the aforementioned result of subtraction. This operation is repeatedly executed until the result of subtraction of 1 kg from the preceding result is zero or negative. When the surcharge due to overweight is determined in this way, the fee data in the additional charge register ACR is doubled and then transferred to the fee register FR. This means that data concerning the sea mail fee is stored in the fee register FR. At this time, whether or not either SEA flag or AIR flag is set is checked. If the AIR flag is set, data corresponding to the basic air mail fee and air mail surcharge for the specified destination region are read out from the ROM 200-2 and respectively written in the air mail basic fee register ABFR and the air mail surcharge register ASR. The basic air mail fee is written, instead of the basic sea mail fee, into fee register FR. If the predetermined weight is exceeded by the postal parcel, data for air mail surcharge stored in the register ASR is added to the fee data in the fee register FR, and the result is written in the fee register FR. Similar to the case of sea mail, this addition is repeated while subtracting data corresponding to a predetermined weight, for instance 500 g, from the previous result of subtraction and the air mail surcharge is added after every subtraction until a result of subtraction represents zero or a negative weight value. In this way, data concerning the air mail fee is stored in the fee register FR when the IR flag is set. When the additional charge key 204-4 is operated in case of either sea mail or air mail, half the sum of the basic fee and surcharge for sea mail, stored in the additional charge register ACR, is added as additional charge data to the fee data in the fee register FR, and the result is written in the fee register FR. Further, when the special delivery key 204-6, advice-of-delivery key 204-5 and price indication key 204-7 are operated, the corresponding fee data is read out from the ROM 200-2 and added to the fee data in the fee register FR, and the result is written in the fee register FR. The data about the charge for price indication may be read out from the ROM 200-2 according to the indicated price data. Subsequently, the fee data in the fee register is transferred to the fee display register FDR. At the same time, data "1" is written in the secodn bit position in the memory area [3, 9], and the same adding operation as described above is executed again. The fee data obtained by the first adding operation is stored in the fee display register FDR, and that obtained by the second adding operation is stored in the fee register FR. If the data in the registers FR and FDR coincide with each other, the first bit position in the memory area [3, 9] is cleared, and the EG flag is reset, indicating that the adding operation is effective. If the data in both the registers FR and FDR do not coincide, and also if no EG flag is set, the second bit position in the memory area [3, 9] is cleared while setting the EG flag, and the fee calculation step is repeated. Further, if the data in both the registers FR and FDR do not coincide while the EG flag is set in the memory area [3, 9], the WB2 flag is reset, that is, the second bit position in the memory area [3, 5] is cleared, and a display step similar to the display step 504 is executed. Subsequently, the error display lamp 202-5 is turned on, and the AG flag is set. The error display lamp 202-5 can be turned off when the clear key 204-10 is operated. At this time, the AG flag is simultaneously reset. Thereafter, a display step 522 similar to the display step 504 is executed. After the end of the display step 522, whether or not the error generation (EG) flag is set is checked. If the EG flag is detected to be set in the total postal charge calculation step 520, a step 514 as shown in FIG. 8 is executed. If the calculation is correctly done so that no EG flag is set, whether "F" data is set in the region selection register RSR is checked in a step 524. If it is detected in the step 524 that no "F" data is set and if the AIR or SEA flag is set, it is checked in a step 525 if the stamp fee entry (SFE) key 204-14 is operated. If it is detected that the SFE key 204-14 is not operated, checks as to whether or not the meter stamp issue (MSI) key 204-12 is operated and whether or not the MSI flag is set are executed in a step 526. If it is detected that the MSI key 204-12 is not operated, if it is detected in the step 524 that "F" data is written in the region selection register RSR, or if it is detected after the step 524 that neither AIR nor SEA flag is set, then reception of weight data, suppression of flickering, automatic zero adjustment, zero setting and rounding of weight data are executed in the manner described in connection with the initialization step 500. Subsequently, whether or not the data [WR1] in the first weight data register WR1 corresponds to 0g is checked. If it is detected that the data [WR1] in the register WR1 has a value corresponding to 0g, the step 512 shown in FIG. 18 is executed, followed by the same data processing as that mentioned before. If it is detected in the step 528 that the data in the register WR1 has a value corresponding to 0g or equal to the data in the zero weight register ZWR whether or not the price indication (PI) flag is set is checked. If the PI flag is set, if "F" data is written in the region selection register RSR or if the PI flag, AIR and SEA flags are all reset, then the key-in data processing step 516 shown in FIG. 18 is executed, followed by data processing similar to that mentioned before. If either AIR or SEA flag is set, whether or not numeral keys 204-9 are operated for writing the indicated price data in the indicated price data register IPR is checked in a step 530 shown in FIG. 20. If it is detected that no numeral key 204-9 is operated, the key-in data processing step 516 shown in FIG. 18 is executed, followed by data processing similar to that mentioned before. Further, it is detected in a step 530 that the numeral keys 204-9 are operated, the NKO flag is set, and also the indicated price data written in the indicated price data register IPR by keying operation is displayed on the display boards 104 and 202. The indicated price can be displayed in, for instance, a total of seven digit positions, namely five digit positions in the fee display section 202-2 in the display board 202 and two lower digit positions in the weight display section 202-1. If it is detected in a step 532 shown in FIG. 20 that the price indication key 204-7 is operated, the PI flag is set, and also after the resetting of the NKO flag the step 516 shown in FIG. 18 is executed again, followed by data processing similar to that mentioned before. If it is detected that the operation of the price indication key 204-7 is not operated, whether or not numeral keys 204-9 are operated is checked. If it is detected that numeral keys 204-9 are operated, the step 530 shown in FIG. 20 is executed. If it is detected that no numeral key 204-9 is operated, whether or not the clear key 204-10 is operated is checked. If it is detected that the clear key 204-10 is operated, the indicated price data that is written by the operation of numeral keys 204-9 is reset, and then the step 590 shown in FIG. 20 is executed. If the clear key 204-10 is not operated, reception of weight data, suppression of flickering, automatic zero adjustment, zero setting and rounding of weight data are executed in the same manner as described earlier in connection with the initialization step 500. Subsequently, whether or not the data in the first weight data register WR1 corresponds to 0g is checked. If it is detected that the data [WR1] in the register WR1 corresponds to 0g, the step shown in FIG. 18 is executed. If the data [WR1] in the register WR1 does not correspond to 0g, the step 532 is executed.

If the total postal charge calculation in the step 520 is correctly executed so that no EG flag is set, key input from the meter stamp issue (MSI) key 204-12 is permitted. If it is detected in the step 526 that the MSI key 204-1 is operated, data "10" is written in the digit count register DCR in a step 534 shown in FIG. 21. Then, the key input is inhibited, data 37 1" is written in the second bit position in the memory of address [3, 4], that is, the MSI flag is set, and the self-illumination type lamp for the MSI key 204-12 is turned on. Thereafter, the CPU 200-1 starts time counting operation in a step 536, and a print request signal and a ready signal are generated and supplied through the I/O unit 200-10 to the meter stamp issuing unit 300 in a step 538. The CPU 300-1 of the meter stamp issuing unit 300 checks, upon reception of the print request signal and ready signal, whether the unit 300 is set in a ready state for issuing meter stamp or in a busy state. If the unit 300 is not in the busy state, an enable signal is supplied from the unit 300 to the charge calculating unit 200. When the CPU 200-1 in the charge calculating unit 300 receives the enable signal in a step 540 before the lapse of a predetermined response period, for instance 10 msec., it interrupts the ready signal, and resets and then resumes the time counting operation to check whether or not the counted time exceeds 20 msec. Also, it transfers the fee data in the fee display register FDR to the meter stamp issuing unit 300. The transfer of the fee data to the meter stamp issuing unit 300 is executed by repeating the generation and interruption of the ready signal for every digit, and each time a digit of the fee data is transferred, the content of the digit count register is reduced by one count. When the content of the digit count register DCR is reduced from "10" to "4", indicating that all the fee data of 6 digits has been transferred to the RAM 300-4 of the meter stamp issuing unit 300, the MSI display lamp is turned off, the key input inhibition is reset, and a clear key lock signal is produced and supplied to the meter stamp issuing unit 300, as shown in FIG. 22. When this state is set up, the charge data transferred to the RAM 300-4 of the meter stamp issuing unit 300 is prevented from being cleared even if the clear key 304-3 is operated, and at the same time a meter stamp corresponding to fee data stored in the RAM 300-4 is permitted to be issued in response to the operation of the MSI key 304-1. In this state, with the removal of the postal parcel from the measuring unit 100, causing the data [WR1] in the first weight data register WR1 to be substantially equal to 0g, the step 512 shown in FIG. 18 is executed, followed by data processing similar to that mentioned before.

Further, if it is detected in the step 540 that no enable signal is received by the postal charge calculating unit 200 due to the busy state of the meter stamp issuing unit 300 and that subsequently 20 msec. has been elapsed, with the removal of the postal parcel from the measuring unit 100 to cause the data in the first weight data register WR1 to correspond to 0g, the self-illumination type lamp for the MSI key 204-12 is turned off, and after the release of the key input inhibition the step 512 shown in FIG. 18 is executed again, followed by data processing similar to that mentioned before.

In this way, with the operation of the MIS key 204-12 after the total charge calculation step has been correctly executed, the charge data is transferred from the charge calculating unit 200 to the meter stamp issuing unit 300. Upon completion of the charge data transfer to the meter stamp issuing unit 300, the clear key lock signal is supplied from the postal charge calculating unit 200 to the meter stamp issuing unit 300 to inhibit the clearing of data in the meter stamp issuing unit 300.

Further, if the charge calculation is correctly executed, at the time of the removal of the postal parcel from the measuring unit 100, the data in the region selection register RSR and that in memory area [3, 2] are transferred to the respective function memory areas FM1 and FM2 irrespective of whether or not the MSI key 204-12 is operated, and subsequently the region selection register RSR and memory areas [3, 2] and [3, 3] are cleared. Also, the clear signal is interrupted if it is present at this time. In this way, the data stored in the first and second function memory areas FM1 and FM2 are transferred to the respective region selection register RSR and memory area [3, 2] when the repetition key 204–13 is operated.

Further, when the postal charge calculation is correctly executed and the stamp free entry (SFE) key 204-14 is operated with the EG flag reset, the stamp fee data is processed in a step 542 (in FIG. 19). In the step 542, after the operation of the SFE key 204-14, the CPU 200-1 receives numeral key data produced in accordance with the operation of numeral keys 204-9 and corresponding to the amount of the stamp fee of the stamps affixed to the postal parcel, and transfers this numeral key data as stamp fee data to the fee display register FDR as shown in detail in FIG. 29. When all the stamp fee data is transferred to the fee display register FDR with the operation of the shortage calculation key 204-15, the CPU 200-1 compares the content of the fee register FR, that is, the calculated postal charge data, and the stamp fee data stored in the fee display register. If it is detected that the stamp fee data is less in value than the calculated postal charge data, it calculates the difference between the two data and supplies the difference thus obtained as shortage data to the fee display register FDR for displaying this data on the display unit 202. At this time, the CPU 200-1 sets the SFS flag and turns on the shortage indication lamp 202-13, thus indicating that the amount of the stamp fee of the stamps affixed to the postal parcel is short of the calculated postal charge. In case if the stamp fee data has a value equal to or greater than that of the calculated postal charge data, the CPU 200-1 sets the SFA flag and turns on the stamp fee admission indicating lamp 202-12 to indicate that the stamps affixed to the postal parcel can cover the calculated postal charge. At this time, the fee data in the fee register FR is transferred to the fee display register FDR, and the calculated postal charge is displayed on the display board 202.

After the stamp fee data is processed in this way in the step 542 (in FIG. 19), whether or not the MSI key 204-12 is operated is checked in a step 544. When it is detected that the MSI key 204-12 is not operated, selective reception of weight data, flickering suppression, automatic zero adjustment and rounding of the weight data are executed as described before in connection with the initialization step 500 shown in FIG. 18. Afterwards, when it is detected that the content [WR1] of the first weight data register WR1 has a value corresponding to 0g the step 512 shown in FIG. 18 is executed, followed by data processing similar to that mentioned before.

Figure 21:
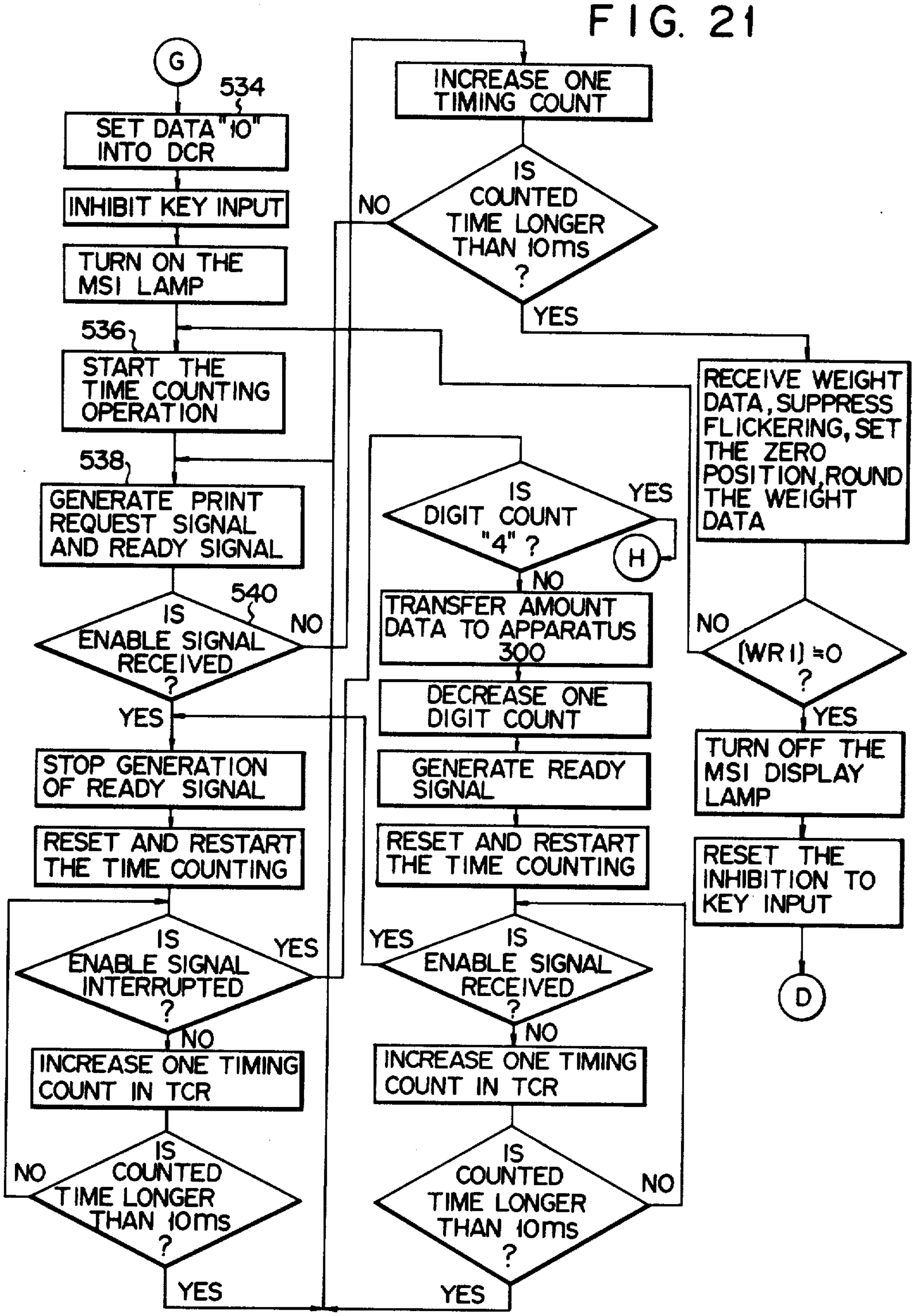

If it is detected in the step 544 that the MSI key 204-12 is operated, a step 534 as shown in FIG. 21 is executed; that is, in this case the stamp fee shortage data stored in the fee display register FDR in the RAM 200-3 in the postal charge calculating unit 200 is transferred to the meter stamp issuing unit 300. A meter stamp corresponding to the stamp fee shortage data is issued when the meter stamp issue key 304-1 in the meter stamp issuing unit 300 is operated.

As has been described in the foregoing, in the state with the postal charge calculated and displayed on the display boards 104 and 202, by operating the stamp fee entry key 204-4, subsequently operating numeral keys 204-9 in accordance with the stamp fee of the stamps affixed to the postal parcel and then operating the shortage calculation key 204-15 the stamp fee data is transferred to the fee display register FDR. Then, if it is detected that the stamp fee data stored in the fee display register FDR has a value less than that of the calculated postal charge data, the difference between the two data is calculated, and the difference data thus obtained is transferred to the fee display register FDR and then displayed on the display boards 104 and 202. Thus, the operator need not calculate the shortage of the stamp fee by himself. Also, the meter stamp representing the shortage can be readily obtained by operating the stamp issue key 304-1 in the meter stamp issuing unit 300.

It is to be understood that if the weight of a postal parcel measured in the weight measuring unit 100 is within a predetermined range, for example, between 30 g and 10 kg, the postal charge calculation is carried out on the basis of the weight data, while if the weight of a postal parcel is within a range between 10 kg and 15 kg only the display of the weight data is executed. In a case where the weight of a postal parcel is larger than 10 kg, the error lamp 202-5 is turned on. When the weight of the postal parcel is fixed within the range between 30 g and 10 kg, the second weight balance (WB2) flag is set in the second bit position in the memory area [3, 5]. Also, the key-in data produced by operating the air mail key 204-1, sea mail key 204-2, region selection key 204-3, special delivery key 204-6 and advice-of-delivery key 204-5 can be processed either before or after the start of measuring operation in the measuring unit 100.

The postal charge calculation becomes effective when and only when the air mail key 204-1 or sea mail key 204-2 is operated, one of the region selection keys 204-3 is selectively operated, or the repetition key 204-1 is operated to set the equivalent data, and the weight data is fixed in a preset range in accordance with the weight data from the measuring unit 100, that is, the first and second weight balance (WB1) and (WB2) flags are set in the third and second bit positions in the memory area [3, 5]. The advice-of-delivery key 204-5 and special delivery key 204-6 may be operated when desired, and when they are operated the corresponding fee data is read out from the RPM 200-2 and processed. The operation of the additional charge key 204-4 and price indication key 204-7 is made invalid unless the air mail key 204-1 or sea mail key 204-2 and region selection key 204-3, or the repetition key 204-13 has been operated.

When the data in the first weight data register WR1 is made substantially equal to 0g with the removal of the postal parcel from the measuring unit 100 after the correct execution of the total postal charge calculation, the data in the region selection register RSR is transferred to the first function memory area FM1, and the flag data in the first to fourth bit positions in the memory area [3, 2] are transferred to the second function memory area FM2. Subsequently, the region selection register RSR and memory areas [3, 2] and [3, 3] are cleared, and the second weight balance (WB2) flag is reset. When the repetition key 204-13 is operated in this state, the data in the first function memory area FM1 is transferred to the region selection register RSR, and the data in the second function memory area FM2 is transferred to the memory area [3, 2]. Thus, once the charge data is calculated by selectively operating the air mail key 204-1, sea mail key 204-2, region selection keys 204-3, additional charge key 204-4, advice-of-delivery key 204-5, special delivery key 204-6 and price indication key 204-7, even with subsequent removal of the postal parcel from the measuring unit 100, the data concerning the operation of the air mail key 204-1, sea mail key 204-2, region selection key 204-3, advice-of-delivery key 204-5 and special delivery key 204-6 are maintained, and by operating the repetition key 204-13 at the time of the next measurement, the data concerning the operation of keys 204-1, 204-2, 204-3, 204-5 and 204-6 can be written into the memory areas [3, 1] and [3, 2].

Figure 27:
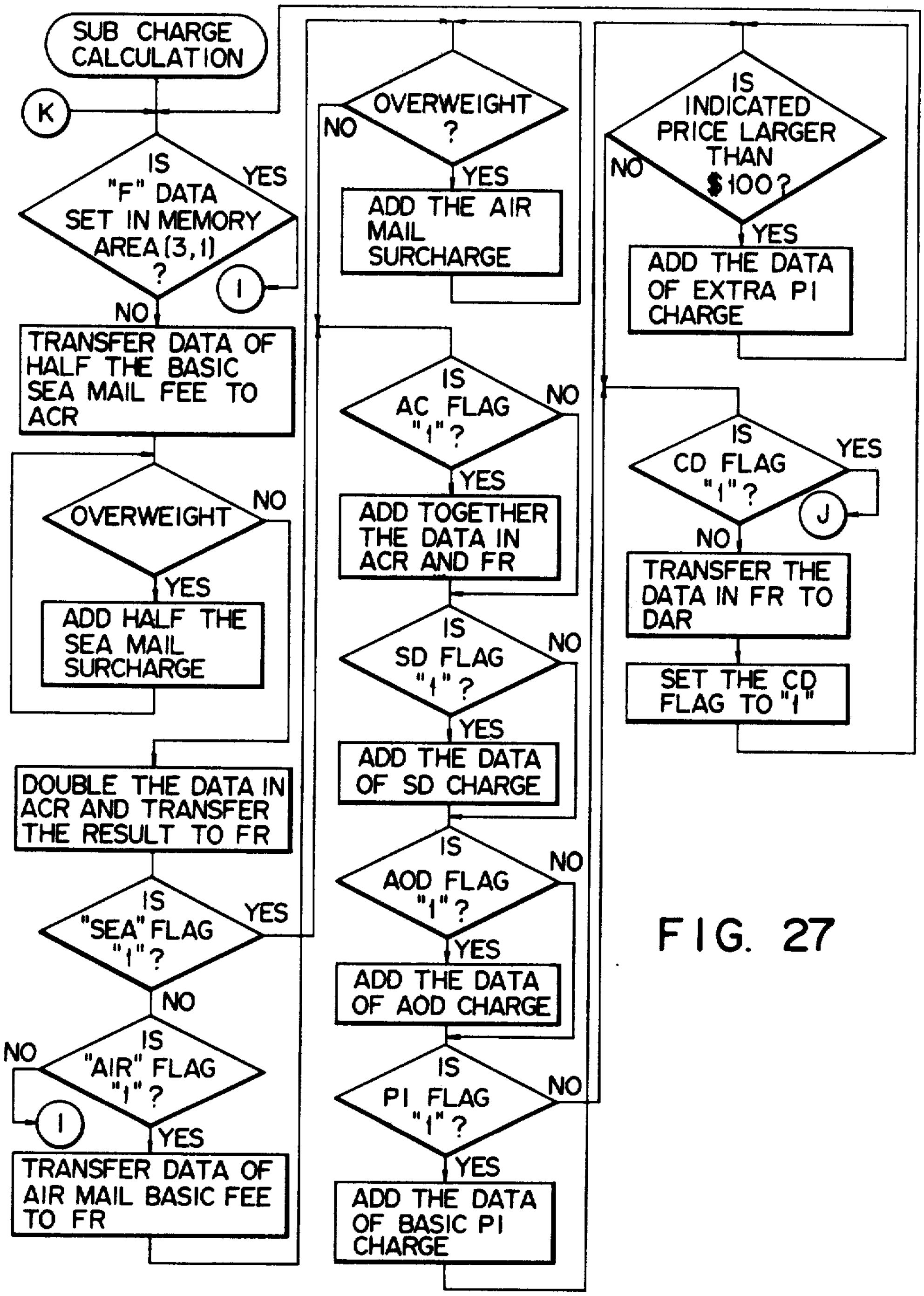
FIGS. 27 and 28 show a flow chart for a subroutine for charge calculation.
Figure 28:
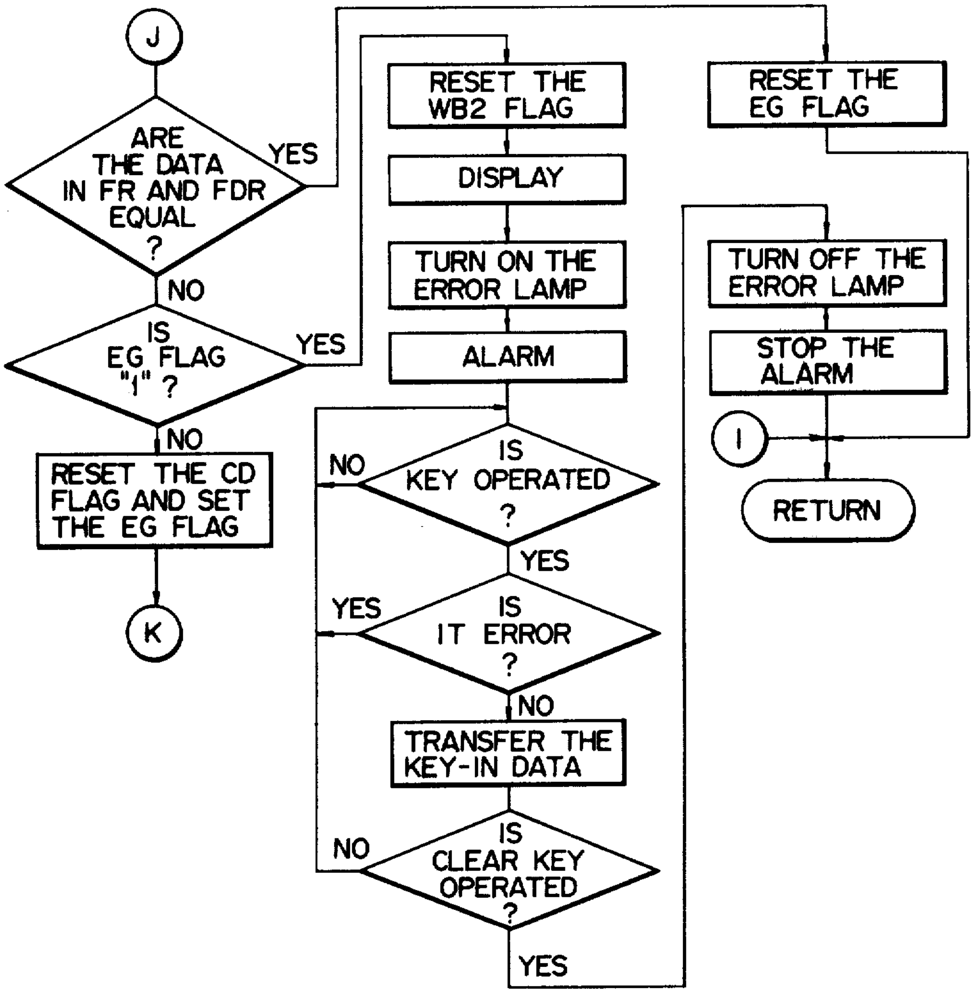

While a preferred embodiment of this invention has been described, it is by no means limitative. For example, while an example of calculation of the surcharge due to overweight of the postal parcel and the additional charge is shown in FIG. 27, it is also possible to use a ROM to obtain the charge data without carrying out such charge calculation. In this case data about surcharges for overweights and additional charges for corresponding weights are stored in the ROM in order to permit readout of given overweight surcharge data and additional charge data from the ROM according to address data corresponding to the overweight and weight of the postal item.

What is claimed is:

1. A postal charge processing system comprising:

weight measuring means for measuring the weight of a postal article and producing weight data corresponding to the weight of the postal article;

first switching means for setting postal conditions including the way of mail and region of mailing destination and for generating postal condition data in accordance with the set postal conditions;

first memory means coupled to said first switching means for storing said postal condition data in accordance with the operation of said first switching means;

display means;

second switching means operated for producing a fee data;

second memory means coupled to said second switching means for storing said fee data produced in accordance with the operation of said second switching means; and first data processing means coupled to said measuring means, to said display means and to said first memory means, said first data processing means including:

means for calculating the postal charge for said postal article based on the weight data from said measuring means and also based on the postal condition data stored in said first memory means and for supplying the calculated postal charge data to said display means for display thereon, and means for calculating, in response to the operation of said second switching means, the difference between the calculated postal charge data and the fee data stored in said second memory means when the calculated postal charge data is greater in value than the fee data, and for supplying difference data corresponding to said difference to said display means for display thereon;

third memory means;

third switching means coupled to said first data processing means and to said third memory means, and being operable to cause said first data processing means to transfer said difference data to said third memory means for storage of said difference data;

printer means;

fourth switching means; and second data processing means coupled to said fourth switching means, to said printer and to said third memory means, and including means responsive to the operation of said fourth switching means for causing said printer means to print said difference data stored in said third memory means.

2. The postal charge processing system of claim 1, further comprising:

fourth memory means coupled to said first data processing means;

fifth switching means coupled to said first data processing means; and means coupled to said measuring means for sensing removal of a postal article from said measuring means on the basis of weight data from said measuring means;

said first data processing means being coupled to said sensing means and being operated, when removal of said postal article from said measuring means is sensed by said sensing means, to transfer the content of said first memory means to said fourth memory means and to then clear the content of said first memory means, and said first data processing means also operating in response to the operation of said fifth switching means to transfer the content of said fourth memory means to said first memory means.

3. A postal charge processing system comprising:

weight measuring means for measuring the weight of a postal article and producing weight data corresponding to the weight of the postal article;

first switching means for setting postal conditions including the way of mail and region of mailing destination and for generating postal condition data in accordance with the set postal conditions;

first memory means coupled to said first switching means for storing said postal condition data in accordance with the operation of said first switching means;

display means;

second switching means operated for producing a fee data;

second memory means coupled to said second switching means for storing said fee data produced in accordance with the operation of said second switching means; and first data processing means coupled to said measuring means, to said display means and to said first memory means, said first data processing means including:

means for calculating the postal charge for said postal article based on the weight data from said measuring means and also based on the postal condition data stored in said first memory means and for supplying the calculated postal charge data to said display means for display thereon, and means for calculating, in response to the operation of said switching means, the difference between the calculated postal charge data and the fee data stored in said second memory means when the calculated postal charge data is greater in value than the fee data, and for supplying difference data corresponding to said difference to said display means for display thereon;

fourth memory means coupled to said first data processing means;

fifth switching means coupled to said first data processing means; and means coupled to said measuring means for sensing removal of a postal article from said measuring means on the basis of weight data from said measuring means;

said first data processing means being coupled to said sensing means and being operated, when removal of said postal article from said measuring means is sensed by said sensing means, to transfer the content of said first memory means to said fourth memory means and to then clear the content of said first memory means, and said first data processing means also operating in response to the operation of said fifth switching means to transfer the content of said fourth memory means to said first memory means.

4. The postal charge processing system of any one of claim 1, 2 or 3, wherein:

said display means includes a first light-emitting unit; and said first data processing means includes means for supplying an energizing signal to said light-emitting unit when it detects that said calculated postal charge data is greater in value than said fee data in said second memory means.

5. The postal charge processing system of claim 4, wherein:

said display means further includes a second light-emitting unit; and said first data processing means including means for detecting that said calculated postal charge data is less in value than said fee data stored in said second memory means, and for supplying a de-energizing signal to said second light-emitting unit responsive to detecting that said calculated postal charge data is less in value than said fee data stored in said second memory means.

6. The postal charge processing system of any one of claims 1, 2 or 3, wherein:

said display means includes a light-emitting unit; and said first data processing means includes means for detecting that said calculated postal charge data is less in value than said fee data stored in said second memory means, and for supplying an energizing signal to said light-emitting unit responsive to detecting that said calculated postal charge data is less in value than said fee data stored in said second memory means.

7. The postal charge processing system of claim 2, further comprising:

fifth switching means for producing key-in data; and wherein:

said first data processing means is coupled to said fifth switching means and includes means for writing key-in data produced in accordance with the operation of said fifth switching means in said third memory means in response to the operation of said fifth switching means.

8. A postal charge processing system comprising:

weight measuring means for measuring the weight of a postal article and producing weight data corresponding to the weight of the postal article;

first switching means for setting postal conditions including the way of mail and region of mailing destination and for generating postal condition data in accordance with the set postal conditions;

first memory means coupled to said first switching means for storing said postal condition data in accordance with the operation of said first switching means;

display means;

second switching means operated for producing a fee data;

second memory means coupled to said second switching means for storing said fee data produced in accordance with the operation of said second switching means; and first data processing means coupled to said measuring means, to said display means and to said first memory means, said first data processing means including:

means for calculating the postal charge for said postal article based on the weight data from said measuring means and also based on the postal condition data stored in said first memory means and for supplying the calculated postal charge data to said display means for display thereon, and means for calculating, in response to the operation of said second switching means, the difference between the calculated postal charge data and the fee data stored in said second memory means when the calculated postal charge data is greater in value than the fee data, and for supplying difference data corresponding to said difference to said display means for display thereon;

said display means includes a first light-emitting unit; and said first data processing means includes means for supplying an energizing signal to said light-emitting unit when it detects that said calculated postal charge data is greater in value than said fee data in said second memory means.

9. The postal charge processing system of claim 8, wherein:

said display means further includes a second light-emitting unit; and said first data processing means including means for detecting that said calculated postal charge data is less in value than said fee data stored in said second memory means, and for supplying a de-energizing signal to said second light-emitting unit responsive to detecting that said calculated postal charge data is less in value than said fee data stored in said second memory means.

10. A postal charge processing system comprising:

weight measuring means for measuring the weight of a postal article and producing weight data corresponding to the weight of the postal article;

first switching means for setting postal conditions including the way of mail and region of mailing destination and for generating postal condition data in accordance with the set postal conditions;

first memory means coupled to said first switching means for storing said postal condition data in accordance with the operation of said first switching means;

display means;

second switching means operated for producing a fee data;

second memory means coupled to said second switching means for storing said fee data produced in accordance with the operation of said second switching means; and first data processing means coupled to said measuring means, to said display means and to said first memory means, said first data processing means including:

means for calculating the postal charge for said postal article based on the weight data from said measuring means and also based on the postal condition data stored in said first memory means and for supplying the calculated postal charge data to said display means for display thereon, and means for calculating, in response to the operation of said second switching means, the difference between the calculated postal charge data and the fee data stored in said second memory means when the calculated postal charge data is greater in value than the fee data, and for supplying difference data corresponding to said difference to said display means for display thereon;

said display means includes a light-emitting unit; and said first data processing means includes means for detecting that said calculated postal charge data is less in value than said fee data stored in said second memory means, and for supplying an energizing signal to said light-emitting unit responsive to detecting that said calculated postal charge data is less in value than said fee data stored in said second memory means.

* * * * *